(12) United States Patent
De Bellis

(10) Patent No.: US 7,574,432 B1
(45) Date of Patent: Aug. 11, 2009

(54) SEARCH-ON-THE-FLY/SORT-ON-THE-FLY SEARCH ENGINE

(75) Inventor: Joseph L. De Bellis, Southampton, NY (US)

(73) Assignee: Pedestrian Concepts LLC, Dover, DE (US)

( * ) Notice: Subject to any disclaimer, the term of this patent is extended or adjusted under 35 U.S.C. 154(b) by 560 days.

(21) Appl. No.: 10/871,050

(22) Filed: Jun. 21, 2004

Related U.S. Application Data

(62) Division of application No. 09/513,340, filed on Feb. 25, 2000, now Pat. No. 6,760,720.

(51) Int. Cl.
*G06F 7/00* (2006.01)

(52) U.S. Cl. .......................................... 707/4; 715/825
(58) Field of Classification Search .................. 707/3, 707/4
See application file for complete search history.

(56) References Cited

U.S. PATENT DOCUMENTS

| | | | |
|---|---|---|---|
| 4,922,486 A | 5/1990 | Lidinsky et al. |
| 5,257,185 A | 10/1993 | Farley et al. |
| 5,345,586 A | 9/1994 | Hamala et al. |
| 5,450,581 A | 9/1995 | Bergen et al. |
| 5,519,866 A | 5/1996 | Lawrence et al. |
| 5,522,066 A | 5/1996 | Lu |
| 5,553,285 A | 9/1996 | Krakauer et al. |
| 5,572,644 A | 11/1996 | Liaw et al. |
| 5,588,150 A | 12/1996 | Lin et al. |
| 5,623,679 A | 4/1997 | Rivette et al. |
| 5,689,698 A | 11/1997 | Jones et al. |
| 5,713,014 A | 1/1998 | Durflinger et al. |
| 5,717,924 A | 2/1998 | Kawai |
| 5,717,925 A | 2/1998 | Harper et al. |
| 5,848,292 A | 12/1998 | Nathan |
| 5,870,746 A | 2/1999 | Knutson et al. |
| 5,873,083 A | 2/1999 | Jones et al. |
| 5,878,423 A | 3/1999 | Anderson et al. |

(Continued)

OTHER PUBLICATIONS

Ramakrishnan, R., Database Management Systems, WCB/McGraw-Hill, 1998, pp. 156-157.*

(Continued)

*Primary Examiner*—Cheyne D Ly
(74) *Attorney, Agent, or Firm*—Andrews Kurth LLP

(57) ABSTRACT

A Sort-on-the-Fly/Search-on-the-Fly search engine provides an intuitive means for searching databases, allowing a user to access data in the database without having to know anything about the database structure. A user selects a desired search term, and the search engine searches the database for all instances of the desired term, even if a specific file or table does not contain the instance. The database need not have a specific file (in a flat database) or a table (in a relational database) of names. The user may specify other criteria, or constraints to narrow the search results, or for other reasons. The search engine then conducts a further search using this criteria and produces a second search result. Further narrowing or broadening of the search are permitted, with the search-on-the-fly search engine returning results based on any new constraints. If the returned data would be too large to be conveniently displayed at a terminal, the search engine executes a truncation routine so that the returned data is easily displayed.

12 Claims, 27 Drawing Sheets

U.S. PATENT DOCUMENTS

| | | |
|---|---|---|
| 5,893,107 A | 4/1999 | Chan et al. |
| 5,895,476 A | 4/1999 | Orr et al. |
| 5,923,330 A | 7/1999 | Tarlton et al. |
| 5,924,090 A | 7/1999 | Krellenstein |
| 5,951,643 A | 9/1999 | Shelton et al. |
| 5,970,490 A | 10/1999 | Morgenstern |
| 5,974,407 A | 10/1999 | Sacks |
| 5,974,418 A | 10/1999 | Blinn et al. |
| 5,978,790 A | 11/1999 | Buneman et al. |
| 5,978,791 A | 11/1999 | Farber et al. |
| 5,978,793 A | 11/1999 | Kashyap et al. |
| 5,991,791 A | 11/1999 | Siefert |
| 6,006,225 A | 12/1999 | Bowman et al. |
| 6,061,797 A | 5/2000 | Jade et al. |
| 6,098,172 A | 8/2000 | Coss et al. |
| 6,119,165 A | 9/2000 | Li et al. |
| 6,138,162 A | 10/2000 | Pistriotto et al. |
| 6,144,958 A | 11/2000 | Ortega et al. |
| 6,169,986 B1 | 1/2001 | Bowman et al. |
| 6,170,012 B1 | 1/2001 | Coss et al. |
| 6,182,083 B1 | 1/2001 | Scheifler et al. |
| 6,366,923 B1 * | 4/2002 | Lenk et al. ............... 707/104.1 |
| 2002/0035643 A1 * | 3/2002 | Morita ...................... 709/245 |
| 2002/0065863 A1 * | 5/2002 | Fruensgaard et al. ........ 709/100 |

OTHER PUBLICATIONS

Search and Information Resources Administration, USPTO, WEST, Version 2.1, Jan. 2002, p. 1-28.*

Search and Information Resources Administration, USPTO, WEST, Version 2.2, Dec. 2003, p. 1-263.*

Sira, EAST Presentation (PPT) (Nov. 1999), USPTO, pp. 1-130.*

* cited by examiner

SEARCH-ON-THE-FLY/SORT-ON-THE-FLY SEARCH ENGINE

CROSS-REFERENCE TO RELATED APPLICATIONS

This application is a divisional application of and claims priority to U.S. patent application Ser. No. 09/513,340, filed Feb. 25, 2000 now U.S. Pat. No. 6,760,720, entitled "Search-on-the-Fly/Sort-on-the-Fly Search Engine." The specification of the earlier application is incorporated herein by reference in its entirety.

TECHNICAL FIELD

The technical field is information management systems, interfaces, and mechanisms, and methods for searching one or more databases.

BACKGROUND

In the most general sense, a database is a collection of data. Various architectures have been devised to organize data in a computerized database. Typically, a computerized database includes data stored in mass storage devices, such as tape drives, magnetic hard disk drives and optical drives. Three main database architectures are termed hierarchical, network and relational. A hierarchical database assigns different data types to different levels of the hierarchy. Links between data items on one level and data items on a different level are simple and direct. However, a single data item can appear multiple times in a hierarchical database and this creates data redundancy. To eliminate data redundancy, a network database stores data in nodes having direct access to any other node in the database. There is no need to duplicate data since all nodes are universally accessible. In a relational database, the basic unit of data is a relation. A relation corresponds to a table having rows, with each row called a tuple, and columns, with each column called an attribute. From a practical standpoint, rows represent records of related data and columns identify individual data elements. The order in which the rows and columns appear in a table has no significance. In a relational database, one can add a new column to a table without having to modify older applications that access other columns in the table. Relational databases thus provide flexibility to accommodate changing needs.

All databases require a consistent structure, termed a schema, to organize and manage the information. In a relational database, the schema is a collection of tables. Similarly, for each table, there is generally one schema to which it belongs. Once the schema is designed, a tool, known as a database management system (DBMS), is used to build the database and to operate on data within the database. The DBMS stores, retrieves and modifies data associated with the database. Lastly, to the extent possible, the DBMS protects data from corruption and unauthorized access.

A human user controls the DBMS by providing a sequence of commands selected from a data sublanguage. The syntax of data sublanguages varies widely. The American National Standards Institute (ANSI) and the International Organization for Standardization (ISO) have adopted Structured English Query Language (SQL) as a standard data sublanguage for relational databases. SQL comprises a data definition language (DDL), a data manipulation language (DML), and a data control language (DCL). The DDL allows users to define a database, to modify its structure and to destroy it. The DML provides the tools to enter, modify and extract data from the database. The DCL provides tools to protect data from corruption and unauthorized access. Although SQL is standardized, most implementations of the ANSI standard have subtle differences. Nonetheless, the standardization of SQL has greatly increased the utility of relational databases for many applications.

Although access to relational databases is facilitated by standard data sublanguages, users still must have detailed knowledge of the schema to obtain needed information from a database since one can design many different schemas to represent the storage of a given collection of information. For example, in an electronic commerce system, product information, such as product SKU, product name, product description, price, and tax code, may be stored in a single table within a relational database. In another electronic commerce system, product SKU, product name, description, and tax code may be stored in one table while product SKU and product price are stored in a separate table. In this situation, a SQL query designed to retrieve a product price from a database of the first electronic commerce system is not useful for retrieving the price for the same product in the other electronic system's database because the differences in schemas require the use of different SQL queries to retrieve product price. As a consequence, developers of retail applications accessing product information from relational databases may have to adapt their SQL queries to each individual schema. This, in turn, prevents their applications from being used in environments where there are a wide variety of databases having different schemas, such as the World Wide Web.

A further problem with conventional search engines is a tendency to return very large amounts of data, or to require the search parameters to be narrowed. When large amounts of data are presented, the display may take many "pages" before all data is seen by the user. The time and expense involved in such a data review may be significant.

SUMMARY

A Sort-on-the-Fly/Search-on-the-Fly search engine (hereafter, search-on-the-fly search engine) provides an intuitive means for searching databases, allowing a user to access data in the database without having to know anything about the database structure. A user selects a desired search term, and a database manager searches the database for all instances of the desired term, even if a specific file or table does not contain the instance. For example, if a user wants to search the database using the name of a specific individual as a database entry point, the database manager will search the database using the desired name, and will organize the search results so that all entries associated with that name are displayed. The database need not have a specific file (in a flat database) or a table (in a relational database) of names. The user may perform further on-the-fly searches to narrow or focus the search results, or for other reasons. For example, given search results for all names that include the name "Smith," the user may then decide to search for all "Smiths" that include an association to an address in New Jersey. The search-on-the-fly search engine then conducts a further search using this criteria and produces a second search result. Further narrowing or broadening of the search are permitted, with the search-on-the-fly search engine returning results based on any new criteria.

In an embodiment, the search-on-the-fly search engine uses graphical user interfaces (GUIs) and one or more icons to make the search process as efficient as possible. The GUIs may incorporate one or more pull down menus of available search terms. As a user selects an item from a first pulldown menu, a subsequent pulldown menu displays choices that are available for searching. The process continues until the search engine has displayed a discrete data entry from the database. The pulldown menus are not pre-formatted. Instead, the pulldown menus are created "on-the-fly" as the user steps through the search process. Thus, the search-on-the-fly search engine is inherently intuitive, and allows a user with little or no knowledge of the database contents, its organization, or a search engine search routine to execute comprehensive searches that return generally accurate results.

The search-on-the-fly search engine also searches on key words specified by the user. The search-on-the-fly search engine can be used to exclude certain items. The search-on-the-fly search engine incorporates other advanced features such as saving search results by attaching a cookie to a user's computer, and associating icons with the search results.

The search-on-the-fly search engine may be used with both internal and external databases. For example, the search-on-the-fly search engine may be used with a company internal database and one or more databases accessible through the Internet.

The search-on-the-fly search engine is user-friendly. With one interface, many different types of databases or database schemas may be searched or sorted.

Finally, the search-on-the-fly technique, and other techniques discussed above may be used in conjunction with a method of doing business, particularly a business method that uses the Internet as a communications backbone.

DESCRIPTION OF THE DRAWINGS

The detailed description will refer to the following figures, in which like numerals refer to like objects, and in which.

DETAILED DESCRIPTION

A sort-on-the-fly/search-on-the-fly search engine (hereafter, search-on-the-fly search engine) provides an intuitive means for searching various types of databases, allowing a user to access data in the database without having to know anything about the database structure. A user selects a desired search term, and a database manager searches the database for all instances of the desired term, even if a specific file or table does not contain the instance. For example, if a user wants to search the database using the name of a specific individual as a database entry point, the database manager will search the database using the desired name, and will organize the search results so that all entries associated with that name are displayed. The database need not have a specific file (in a flat database) or a table (in a relational database) of names. The user may perform further on-the-fly searches to narrow the search results, or for other reasons. The search engine then conducts a further search using this criteria and produces a second search result. Further narrowing or broadening of the search are permitted, with the search engine returning results based on any new criteria.

Figure 1:
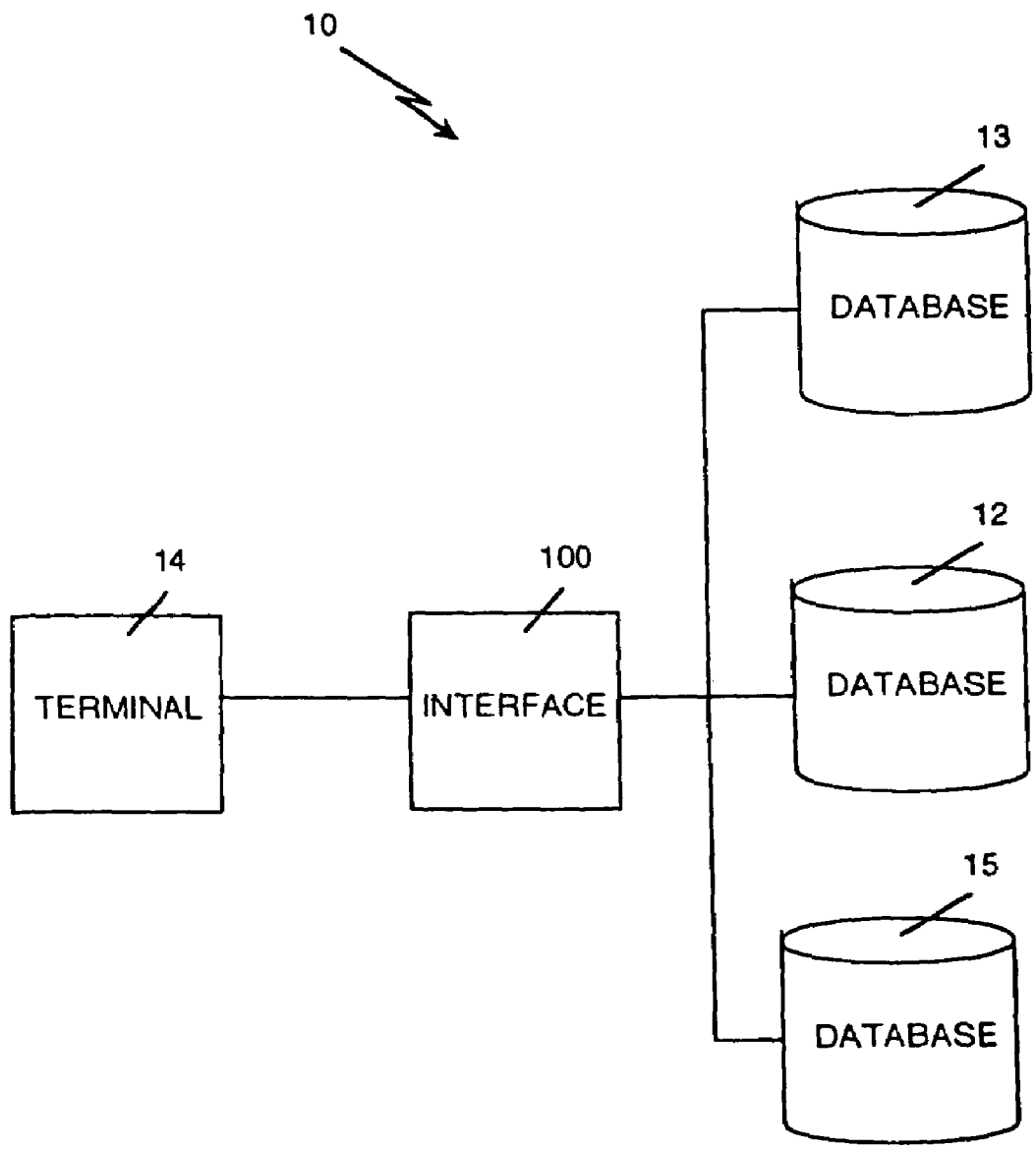
FIG. 1 is a block diagram of a system that uses a search-on-the-fly/sort-on-the-fly search engine.

FIG. 1 is a block diagram of a system 10 that uses the search-on-the-fly search engine. In FIG. 1, a database 12 is accessed using a hardware/software interface device 100 to provide data to a user terminal 14. Additional databases 13 and 15 may also be accessed by the terminal 14 using the device 100. The databases 12, 13 and 15 may use different schemas, or may use a same schema. As will be described later, the device 100 may include the search-on-the-fly search engine. In an alternative embodiment, the search-on-the-fly search engine may be co-located with the terminal 14. In yet another embodiment, the search-on-the-fly search engine may be incorporated into the structure of one or more of the databases 12, 13 and 15. The device 100 may interface with any one or more of the databases 12, 13 and 15 using a network connection such as through the Internet, for example. Other communications mediums may also be used between the terminal 14, the device 100 and any one or more of the databases 12, 13 and 15. These mediums may include the public switched telephone network (PSTN), cable television delivery networks, Integrated Services Digital Networks (ISDN), digital subscriber lines (DSL), wireless means, including microwave and radio communications networks, satellite distribution networks, and any other medium capable of carrying digital data.

Figure 2:
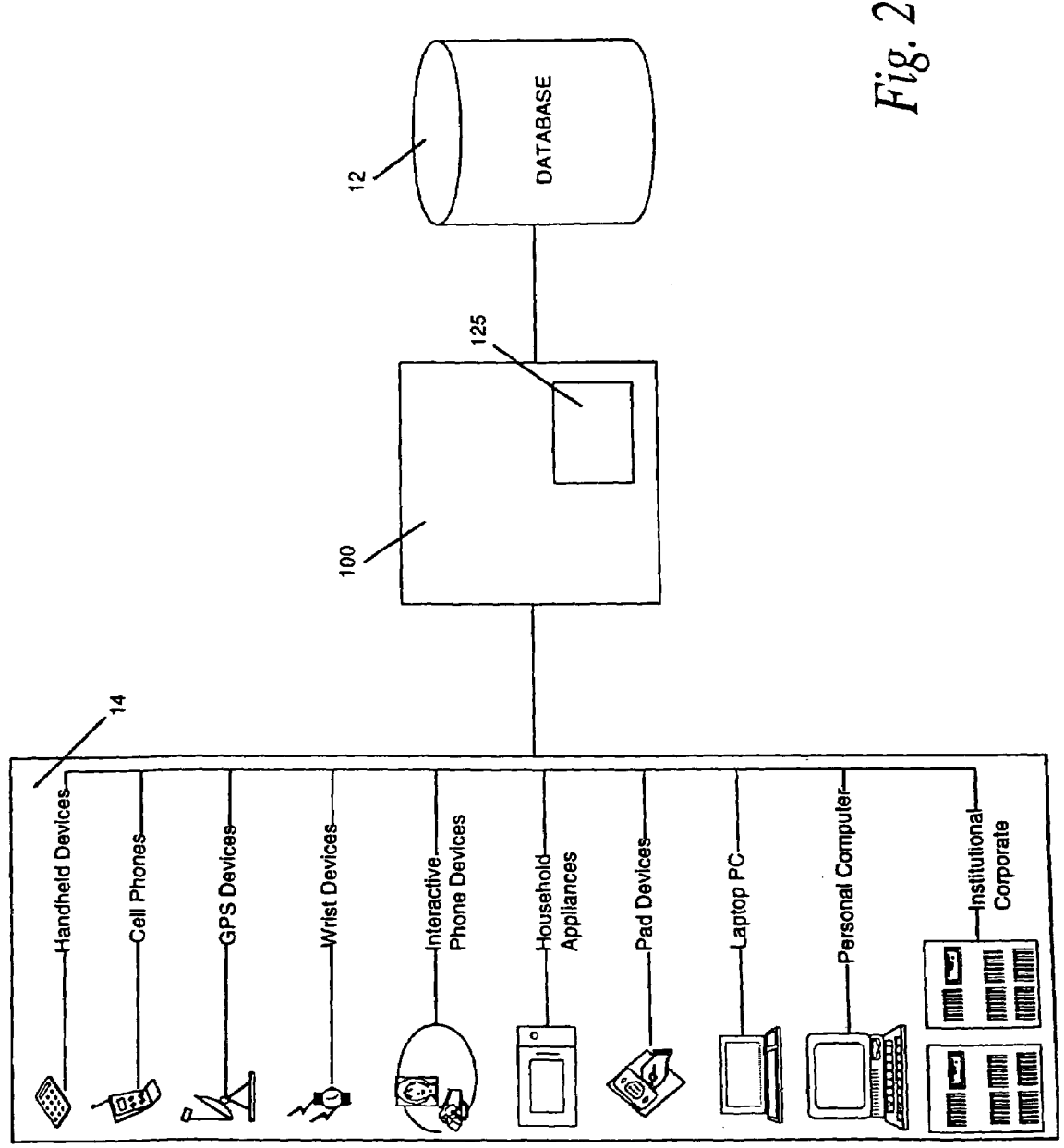
FIG. 2 is another overall block diagram of the system of FIG. 1.

The system shown in FIG. 1 is but one of many possible variations. The search-on-the-fly search engine could also be incorporated within a single computer, such as a personal computer, a computer network with a host server and one or more user stations, an intranet, and an Internet-based system, as shown in FIG. 2. Referring again to FIG. 2, the terminal 14 may be any device capable of displaying digital data including handheld devices, cellular phones, geosynchronous positioning satellite (GPS) devices, wrist-worn devices, interactive phone devices, household appliances, televisions, television set top boxes, handheld computers, and other computers.

Figure 3:
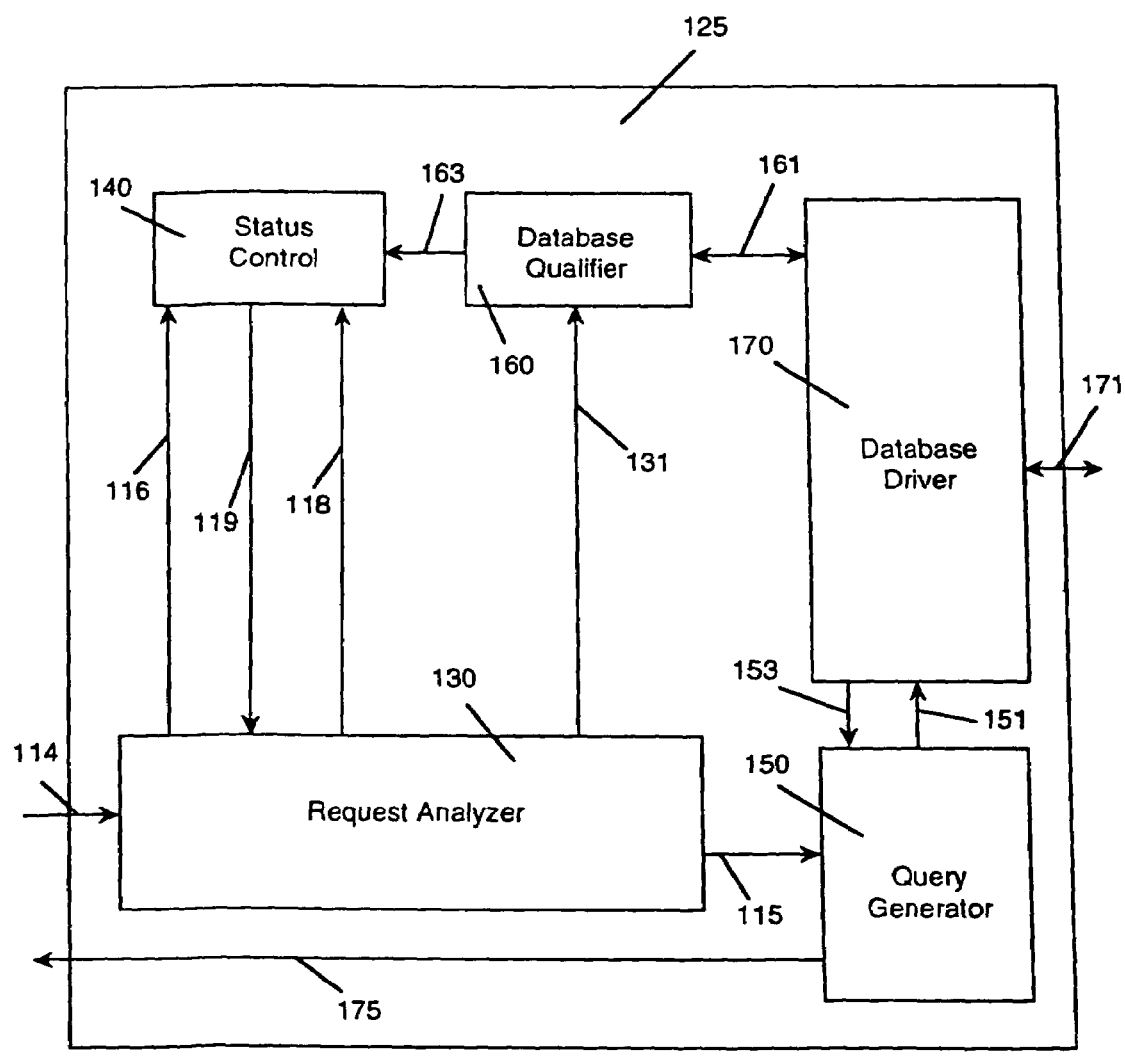
FIG. 3 is a detailed block diagram of the search engine used with the system of FIG. 2.

FIG. 3 is a detailed block diagram of an exemplary search-on-the-fly search engine 125. The search engine 125 includes a request analyzer 130 that receives search requests 114 from the terminal 14 (not shown in FIG. 3) and sends out updated requests 115 to a query generator 150. A status control 140 receives a status update signal 116 and a request status control signal 118 and sends out a request status response 119 to the request analyzer 130. The status control 140 also keeps track of search cycles, that is, the number of search iterations performed. The query generator 150 receives the updated requests 115 from the request analyzer 130 and sends a database access signal 151 to a database driver 170. The query generator 150 receives results 153 of a search of the database 12 (not shown in FIG. 3) from the database driver 170. The query generator 150 provides a display signal 175 to the terminal 14. The database driver 170 sends a database access signal 171 to the database 12. Finally, a database qualifier 160 receives information 161 from the database driver 170 and provides a list 163 of available data fields from the database 12. As will be described later, the list of available data fields 163 may be displayed to a user at the terminal 14, and may be sorted and processed using the request analyzer 130 in conjunction with the database qualifier 160. The database qualifier 160 also receives search information and other commands 131 from the request analyzer 130.

The search engine 125 may identify a database schema by simply using a trial and error process. Alternatively, the search engine 125 may use other techniques know in the art. Such techniques are described, for example, in U.S. Pat. No. 5,522,066, "Interface for Accessing Multiple Records Stored in Different File System Formats," and U.S. Pat. No. 5,974, 407, "Method and Apparatus for Implementing a Hierarchical Database Management System (HDBMS) Using a Relational Database Management System (RDBMS) ad the Implementing Apparatus," the disclosures of which is hereby incorporated by reference.

The search engine 125 provides search-on-the-fly search capabilities and more conventional search capabilities. In either case, the search engine 125 may perform a preliminary database access function to determine if the user has access to the database 12. The search engine 125 also determines the database schema to decide if the schema is compatible with the user's data processing system. If the database schema is not compatible with the user's processing system, the search engine 125 may attempt to perform necessary translations so that the user at the terminal 14 may access and view data in the database 12. Alternatively, the search engine 125 may provide a prompt for the user indicating incompatibility between the terminal 14 and a selected database.

The search engine 125 may conduct a search using one or more search cycles. A search cycle includes receipt of a request 114, any necessary formatting of the request 114, and any necessary truncation steps. The search cycle ends when a result list 175 is provided to the terminal 14. The search engine 125 may retain a status of each past and current search cycle so that the user can modify the search at a later time. The user may also use this feature of retaining a status of past and current search cycles to combine results of multiple searches, using, for example, a Boolean AND function, a Boolean OR function, or other logic function. The above listed functions will be described in more detail later.

Figure 4:
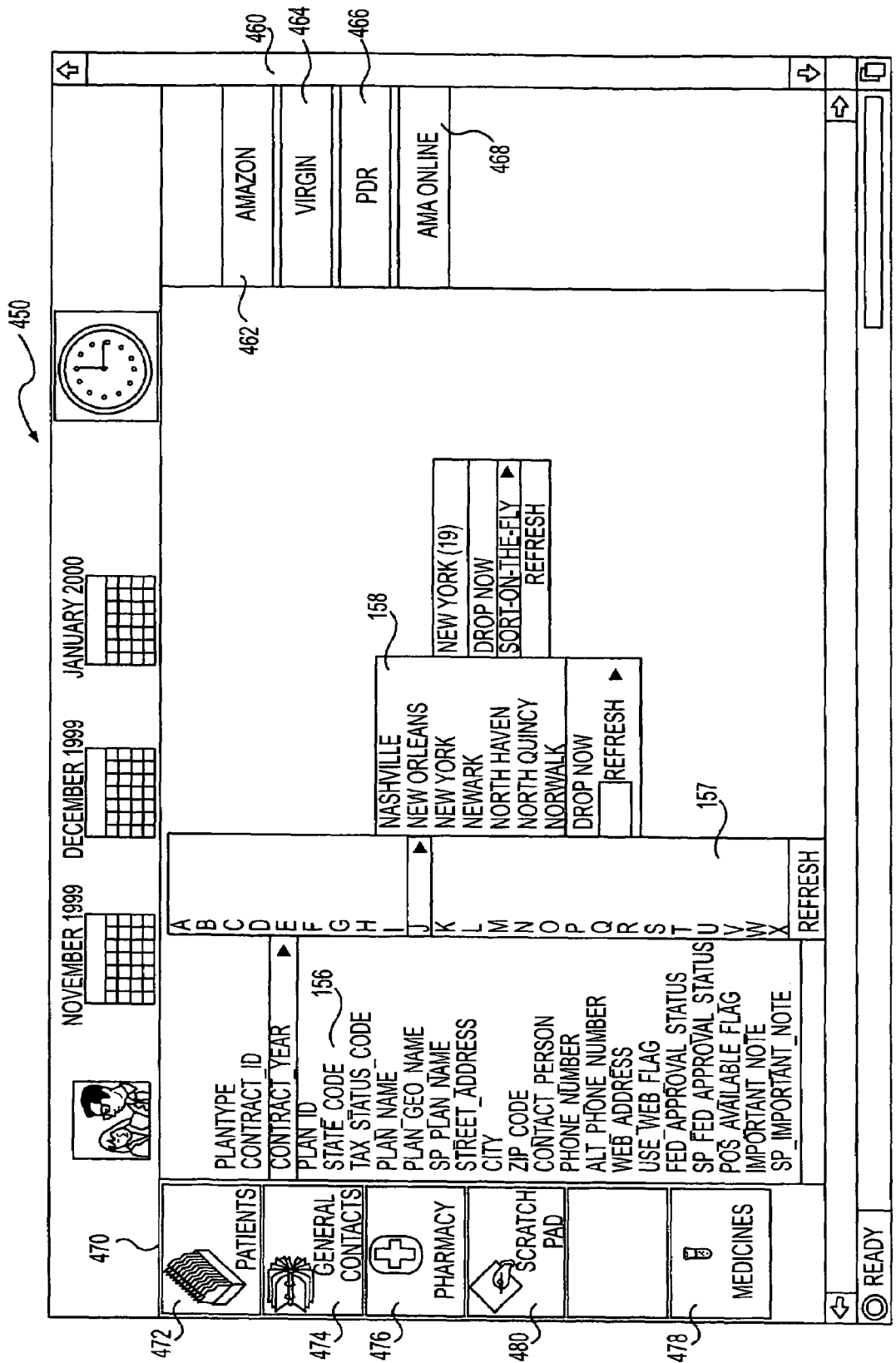
FIG. 4 is an example of a search-on-the-fly using the search engine of FIG. 3.

The search-on-the-fly function of the search engine 125 begins by determining available data fields of the database 12. The database 12 may have its data organized in one or more data fields, tables, or other structures, and each such data field may be identified by a data field descriptor. In many cases, the data field descriptor includes enough text for the user at the terminal 14 to determine the general contents of the data field. The list of data fields may then be presented at the terminal 14, for example, in a pull down list. An example of such a data field result list is shown in FIG. 4, which is from a federal database showing data related to managed health care organizations. This database is available at http://tobaccopapers.org/dnld.htm. In FIG. 4, the first data field listed is "Plan-Type," which is shown in result list 156. Other data field descriptors show the general categories of data in the database.

Using the terminal 14, the user may select one of the data field descriptors to be searched. For example, the user could select "city." If a number of entries, or records, in the city data field is short, a further result list of complete city names may be displayed. If the entries are too numerous to be displayed within a standard screen size, for example, the search engine 125 may, in an iterative fashion, attempt to reduce, or truncate, the result list until the result list may be displayed. In the example shown in FIG. 4, entries in the city data field are so numerous (the database includes all U.S. cities that have a managed health care organization) that the search engine 125 has produced a result list 157 that shows only a first letter of the city. Based on the available database data fields, the user may then perform a further search-on-the-fly. In this case, the user may choose cities whose first initial is "N." The search engine 125 then returns a result list 158 of cities whose names start with the letter "N." Because in this instance the result list 158 is short, no further truncation is necessary to produce a manageable list.

Figure 5:
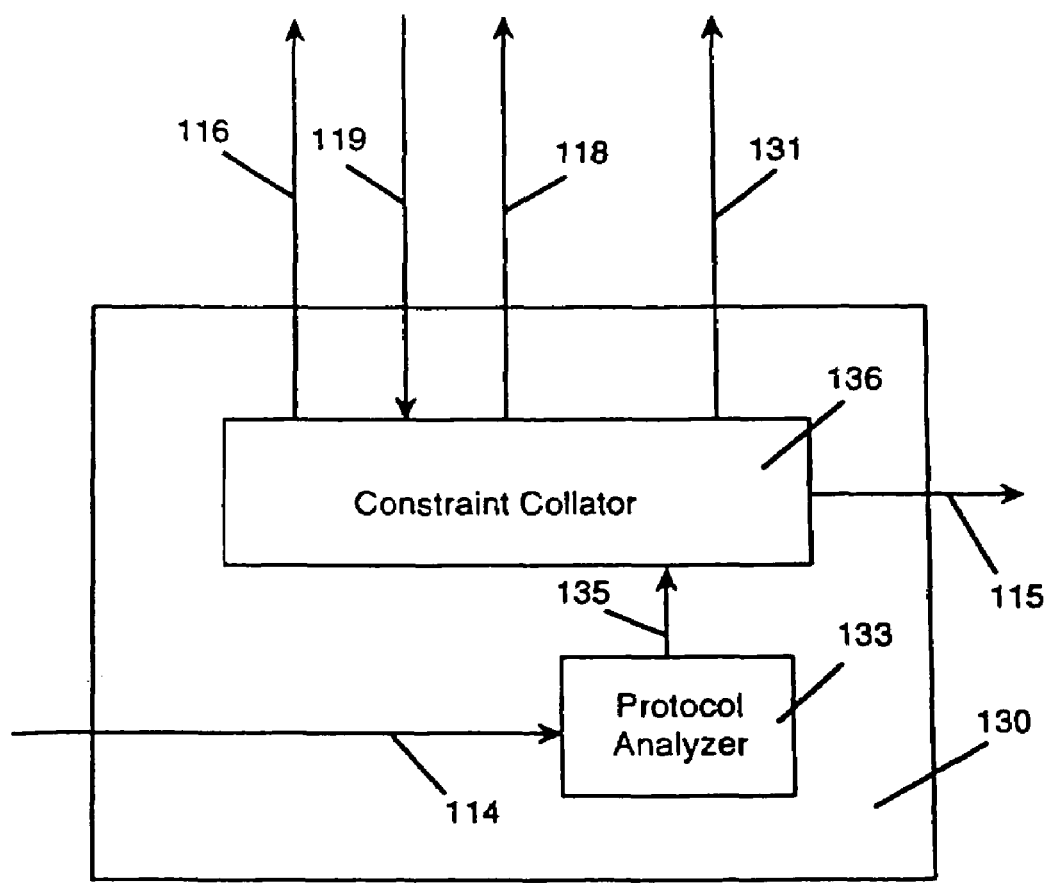
FIGS. 5-9 are detailed block diagrams of components of the search engine of FIG. 3.

FIG. 5 is a more detailed block diagram of the request analyzer 130. A protocol analyzer 133 receives the request 114 and provides an output 135 to a constraint collator 136. The protocol analyzer 133 examines the received request 114, determines a format of the request 114, and performs any necessary translations to make the request format compatible with the database to be accessed. If the database to be accessed by the terminal 14 is part of a same computer system as the terminal 14, then the protocol analyzer 133 may not be required to perform any translations or to reformat the request 114. If the database to be accessed is not part of the same computer system as the terminal 14, then the protocol analyzer 133 may be required to reformat the request 114. The reformatting may be needed, for example, when a request 114 is transmitted over a network, such as the Internet, to a database coupled to the network.

The constraint collator 136 provides the updated request 115 (which may be an initial request, or a subsequent request) to the query generator 150. The constraint collator 136 is responsible for interpreting the request 114. The constraint collator 136 performs this function by comparing the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). In an embodiment, the constraint collator 136 compares constraint information in a current request 114 to constraint information residing in the status control 140, and if the current request 114 includes a new constraint, such as a new narrowing request (for example, when the user clicks, touches or points over a field shown in a last search cycle), then the constraint collator 136 adds the updated information and sends the updated request 115 to the query generator 150. If the constraint status should be updated, the constraint collator 136 sends the status update 118 to the status control 140. If the request 114 is a refresh request, the constraint collator 136 sends a reset command 131 to the database qualifier 160. The updated request 115 (possibly with a new constraint) is then sent to the query analyzer 150 for further processing.

Figure 6:
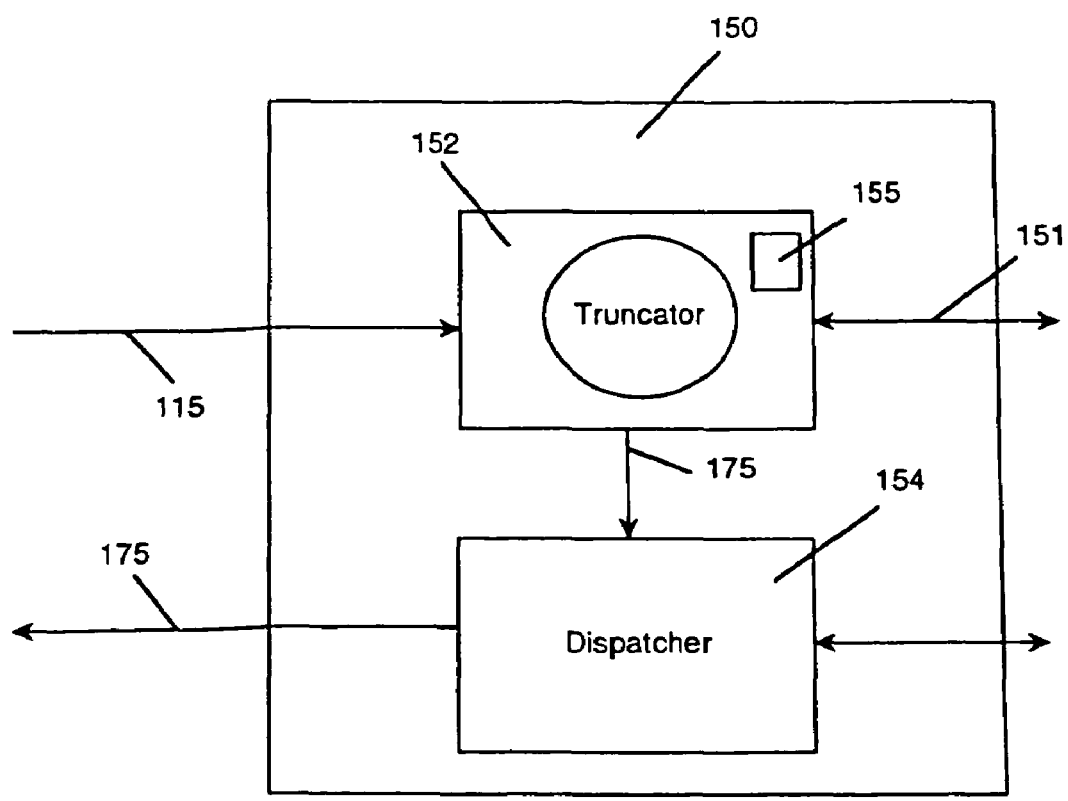

FIG. 6 is a block diagram of the query generator 150. The overall functions of the query generator 150 are to scan a database, such as the database 12, using the database driver 170, and to collect search results based on constraints supplied by the request analyzer 130. The query generator 150 then returns the search results 175 to the terminal 14.

The query generator 150 includes a truncator 152 and a dispatcher 154. The truncator 152 receives the updated request 115, including a new constraint, if applicable. The truncator 152 creates new queries, based on new constraints, and applies the new requests 151 to the database 12 using the database driver 170. The truncator 152 may include a variable limit 155 that is set, for example, according to a capacity of the terminal 14 to display the search results 175. If data retrieved from the database 12 exceed the limit value, the truncator 152 adjusts a size (e.g., a number of entries or records) of the data until a displayable result list is achieved. One method of adjusting the size is by cycling (looping). Other methods may also be used to adjust the size of the result list. For example, the terminal 14 may be limited to displaying 20 lines of data (entries, records) from the database 12. The truncator 152 will cycle until the displayed result list is at most 20 lines. In an embodiment, the truncation process used by the truncator 152 assumes that if the user requests all values in a particular data field from the database 12, and there are no other constraints provided with the request 114, and if the size of the resulting result list is larger than some numeric parameter related to a display size of the terminal 14, then the constraints may be modified by the truncator 152 so that the result list can accommodated (e.g., displayed on one page) by the terminal 14. For example, instead of a full name of a city, some part of the name—the first n letters—is checked against the database 12 again, and n is reduced until the result list is small enough for the capacity of the terminal 14. If the maximum number of displayable results is three (3), and the database 12 contains the names of six cities "Armandia, Armonk, New Orleans, New York, Riverhead, Riverdale," then the first attempt to "resolve" the result list will stop after a result list display is created with the full name of the cities:

Armandia, Armonk, New Orleans. (the limit was reached)

Try again with 7 characters:

Armandia, Armonk, New Orl, New Yor, (limit reached again)

Again with 5 characters:

Armandia, Armonk, New O, New Y, (limit reached again)

Again with 3 characters:

Arm ( . . . ), New ( . . . ), Riv ( . . . ). These results may now be displayed on the terminal 14. The display of Arm, New, Riv can then be used to conduct a further search-on-the-fly. For example, a user could then select Riv for a further search-on-the-fly. The result list returned would then list two cities, namely Riverhead and Riverdale.

In another embodiment, a fixed format is imposed such that all queries generated against a database will have preset limits corresponding to the capacity of the terminal 14.

In yet another embodiment, the truncator 152 may adjust the field size by division or other means. For example, if the display limit has been reached, the truncator 125 may reduce the field size, X by a specified amount. In an embodiment, X may be divided by two. Alternatively, X may be multiplied by a number less than 1, such as ¾, for example. Adjusting the field size allows the search engine 125 to perform more focused searches and provides more accurate search results.

In still another embodiment, the user may select a limit that will cause the truncator 152 to adjust the field size. For example, the user could specify that a maximum of ten entries should be displayed.

For certain data fields, a terminal 14, such as a hand-held device for example, may have a very limited display capacity. Alternatively a user may specify a limit on the number of entries for display. In these two illustrated cases, the search engine 125 may return a result list 175 of the request 114 on multiple display pages, and the user may toggle between these multiple display pages. As an example, if the terminal 14 is limited to displaying a maximum of ten entries, and if the request 114 results in a return of a data field comprising the 400 largest cities in the United States, the truncator 152 will produce a list of 23 entries comprising 23 alphabetical characters (no cities that begin with Q, Y or Z—see FIG. 4). The search engine 125 may then display the results on three pages.

Alternatively, the truncator 152 could produce a list of letter groups into which the cities would fall, such as A-D, E-G, H-M, N-R, and R-X, for example. In another alternative, the search engine 125 may send a notice to the terminal that the request 114 cannot be accommodated on the terminal 14 and may prompt the user to add an additional constraint to the request 114, so that a search result may be displayed at the terminal 14.

Figure 14:
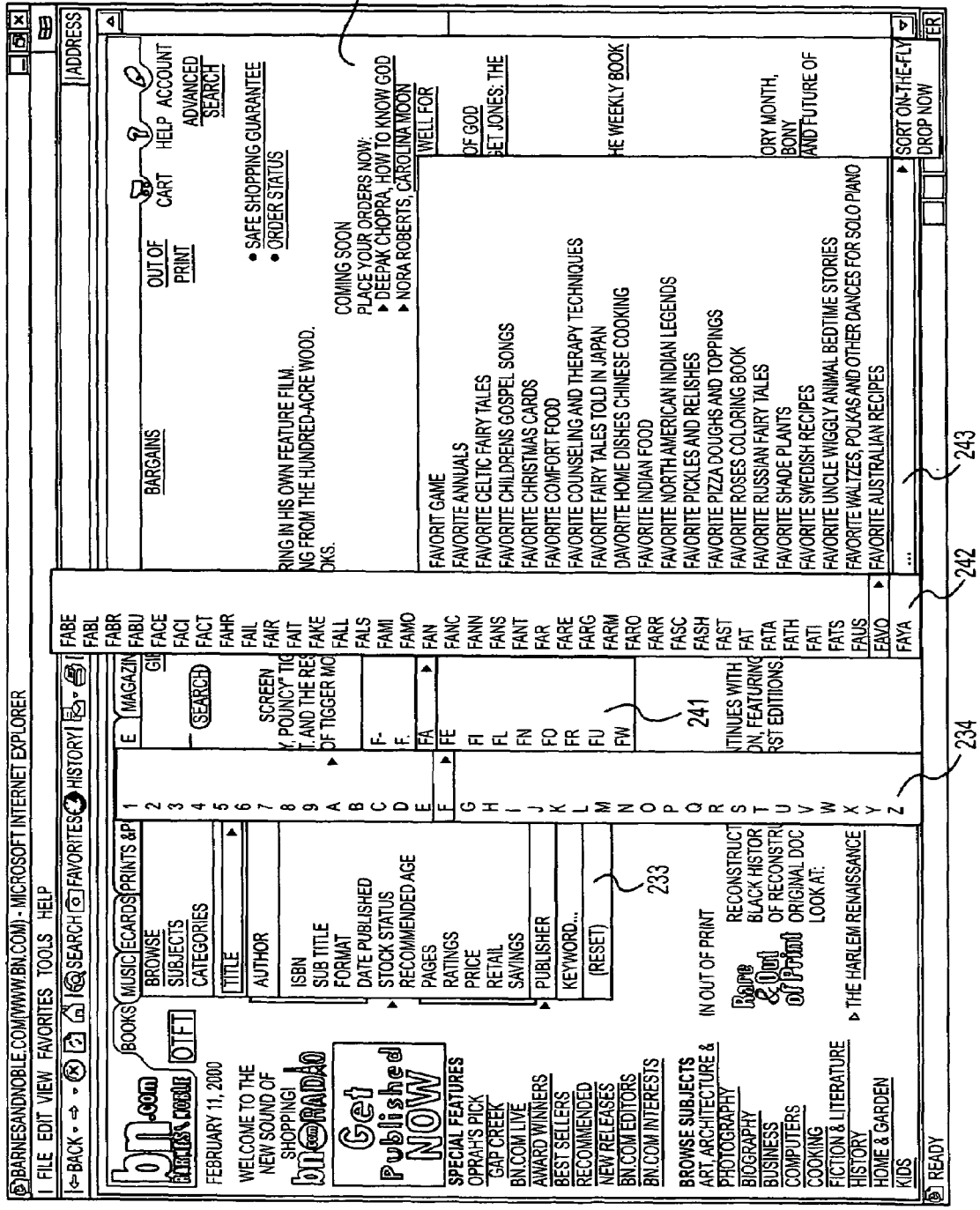

Adjusting the data field size also provides more convenient search results for the user. For example, if a user were to access an Internet-based database for books for sale, and were to request a list of all book titles beginning with the letter "F," a common search engine might return several hundred titles or more, displaying perhaps twenty titles (entries) at a time. The user would then have to look through each of many pages to find a desired title. This process could be very time-consuming and expensive. Furthermore, if the search results were too large, the common search engine might return a notice saying the results were too large for display and might prompt the user to select an alternative search request. However, performing the same search using the search engine 125 allows the truncator 152 to reduce the size of the information displayed to a manageable level. In this example, if the request 114 includes the constraint "F," the truncator 152 will loop through the data in a data field that includes book titles starting with the letter "F" until a list is available that can fit within the display limits of the terminal 14, or that fits within a limit set by the user, for example. The first list returned to the terminal 14 as a result of this request 114 may be a two letter combination with "F" as the first letter and a second letter of a book title as the second letter. For example, the first list may include the entries "Fa," "Fe," "Fi," "Fo," and "Fu," all of which represent titles of books. The user could then select one of the entries "Fa," "Fe," "Fi," "Fo," and "Fu" to perform a further search, continuing the process until one or more desired titles are displayed. An example of a similar truncation result is shown in FIG. 14.

When a parameter related to the search results is adequately truncated, the parameter is directed to the dispatcher 154, which retrieves the data from database 12 using the database driver 170. The dispatcher 154 then directs the final, truncated search results 175 back to the terminal 14 as a response to the request 114.

Figure 7:
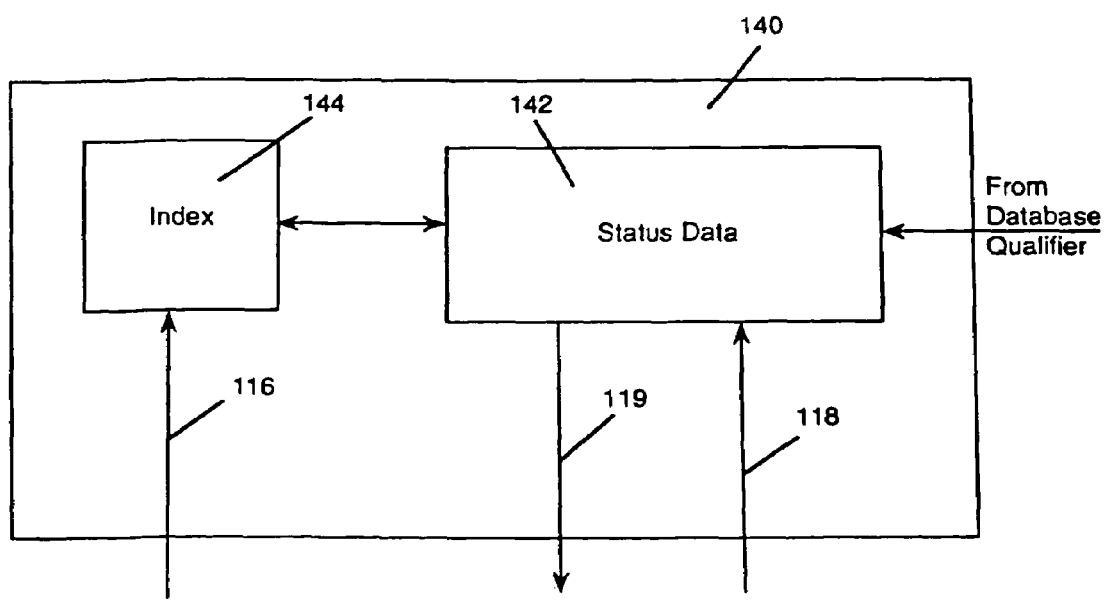

FIG. 7 is a block diagram showing the status control 140, which is responsible for monitoring the status of a current search. Due to the nature of the search engine 125, the user can choose any combination of constraints, fields or keywords, including those from past and current search cycles. The status control 140 may keep track of all past cycles of the search, as well as all information necessary to return to any of those past search cycles. The status control 140 includes a status data module 142, and an index module 144. The status data module 142 contains data related to each such search cycle, including the constraint(s) entered during the search cycle, any truncation steps taken, and the results of such truncation, for example. The index module 144 provides access to these data. When the request 114 is being analyzed by the request analyzer 130, the constraint collator 136 sends a request status query 116 to the index module 144. The status data module 142 contains information related to all past and current search cycles, which are referenced by the index module 144, and delivers a status response 119 for the most recent search cycle to the constraint collator 136. When a new constraint is sent to the query generator 150, the status data module 142 is updated 118 by the constraint collator 136.

Specific structures of the request 114, the request status query 116, the status response 119 and the request status control 118 will be provided later.

The status data module 142 may be reset by the database qualifier 160 with all available fields when a refresh function is used. In an embodiment, the refresh function may be used to clear all past search cycles and the current search cycle from the status control 140. In such an event, the search results, such as the search results shown in FIG. 4, will no longer be displayed at the terminal 14, and data related to the past and the current search cycles may not be used for future search cycles. In effect, the refresh function may cause the entire search to be discarded. The refresh function may be activated when a user selects a refresh button (see FIG. 4) on a displayed result list, or on another portion of a GUI. Alternatively, the refresh function may discard selected search cycles. In this alternative embodiment, the user may, for example, move a cursor to a desired result list from a past search cycle and activate a refresh, reset, back, or drop button. All data associated with search cycles subsequent to the selected search cycle, including all displayed result lists may then be discarded.

Figure 8:
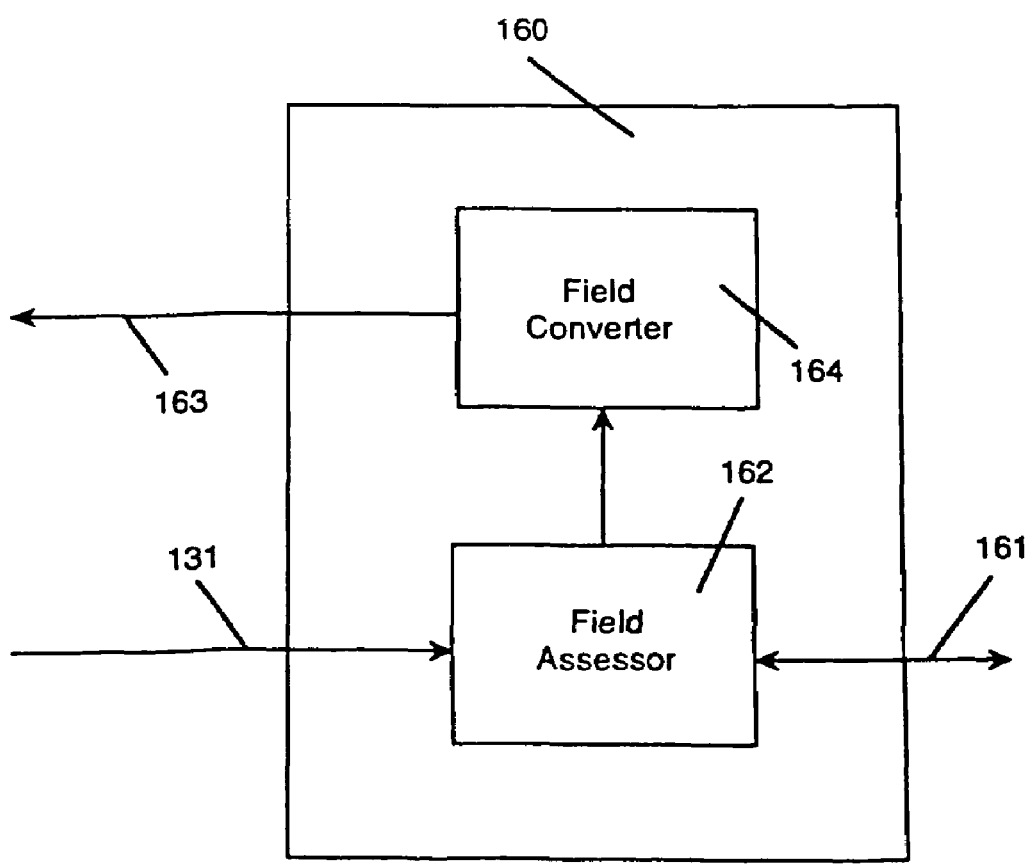

FIG. 8 is a block diagram showing the database qualifier 160. The database qualifier 160 provides data field information at the start of a search or when the search engine 125 is refreshed. A field assessor 162 access the database 12 using the database driver 170, and identifies and accesses discrete data fields and other information in the database 12. A field converter 164 structures the data field information into a usable (searchable/sortable) structure and sends 163 the formatted data field information to the status control 140. Techniques for identifying and accessing the data fields, and for formatting the data field information are well known in the art. Such techniques are described, for example, in U.S. Pat. No. 5,222,066, Interface for Accessing Multiple Records Stored in Different File System Formats, the disclosure of which is hereby incorporated by reference.

Figure 9:
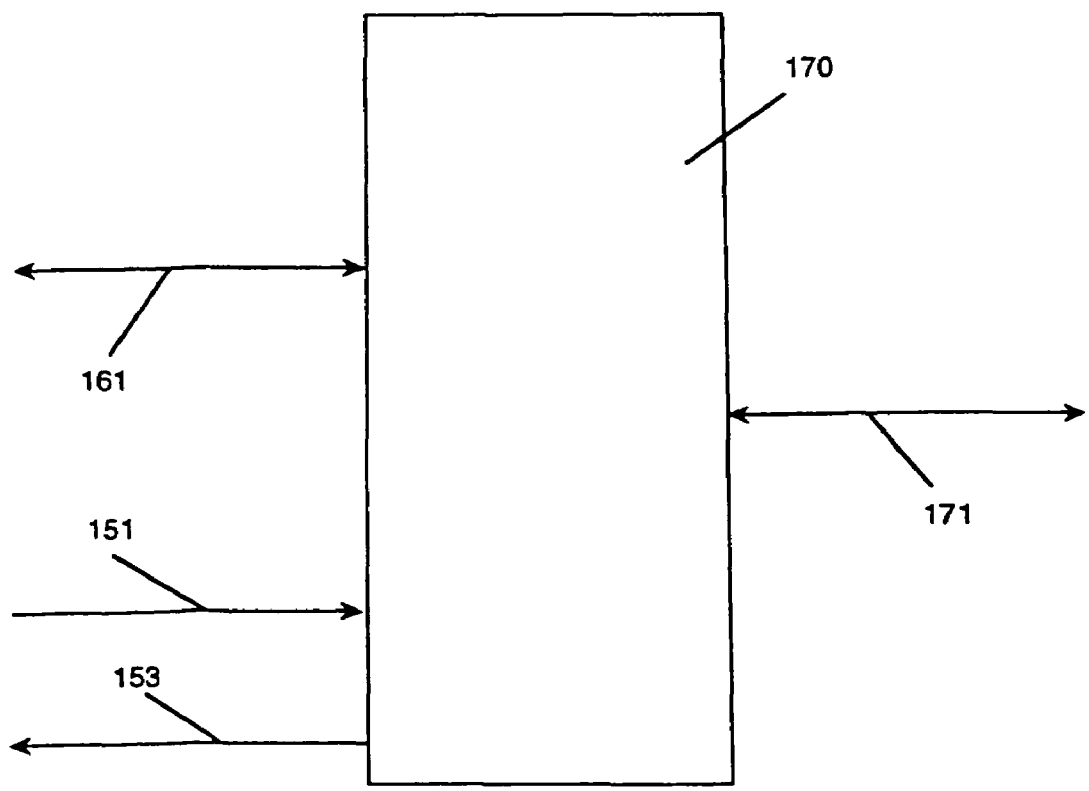

FIG. 9 is a block diagram of the database driver 170. The database driver 170 is the universal interface with the database 12, which can be a local or a remote database.

Figure 10:
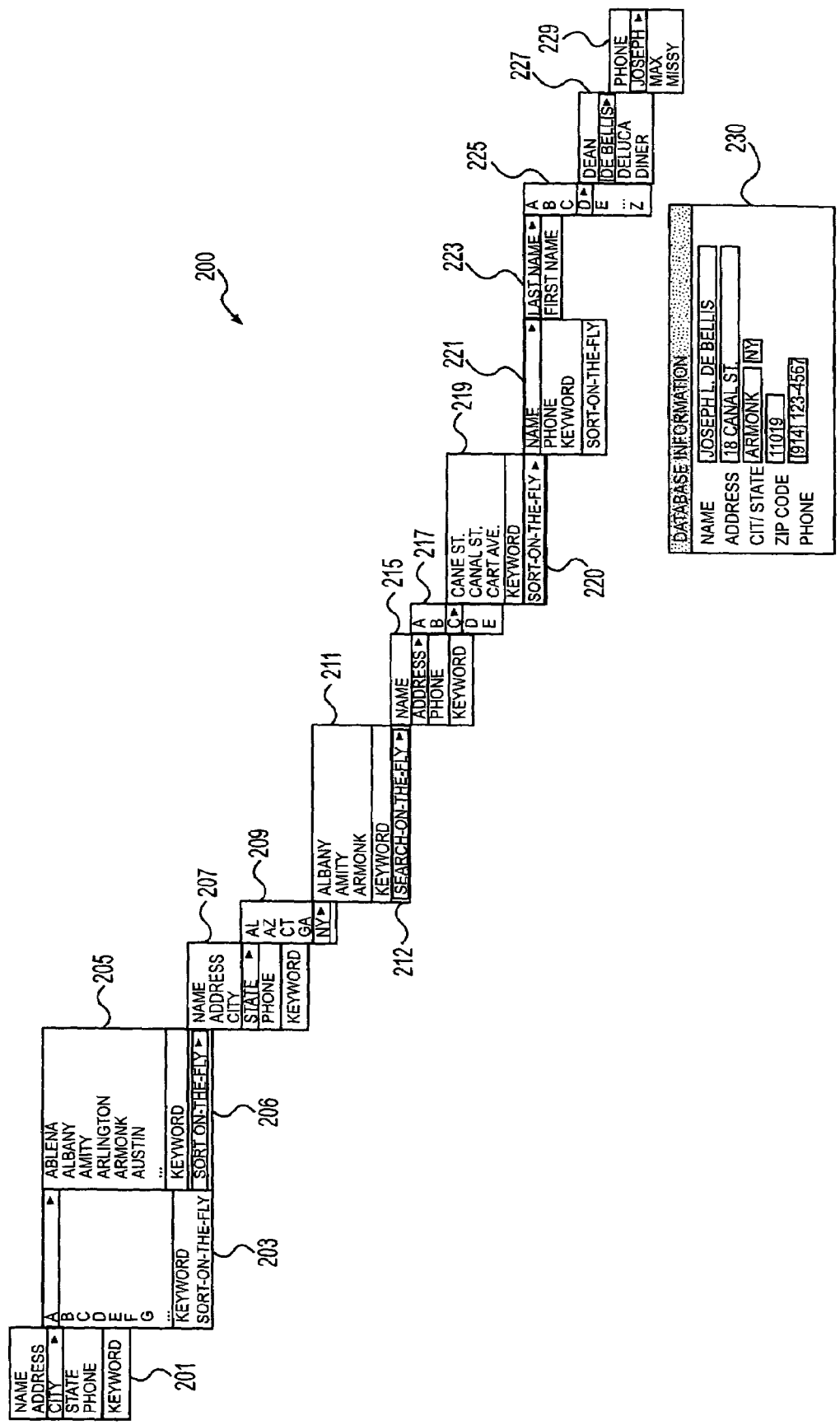
FIG. 10 is another example of a search-on-the-fly using the search engine of FIG. 3.

FIG. 10 is an example of a search-on-the-fly using the search engine 125. In FIG. 10, a database 200 includes information related to a number of individuals. The information in the database 200 may be presented at the terminal 14 using a series of screens or menus 201-230. The user first accesses the database 200 and is presented with a list 201 of the information or data fields contained in the database 200. The result list 201 is generated by the field assessor 162, and is provided for display at the terminal 14 by the query generator 150. As shown in FIG. 10, a user has selected the data field "City" for display of information. However, the number of "cities" listed in the database 200 is too large to conveniently display at one time (i.e., on one page) at the terminal 14. Accordingly, the truncator 152 will loop a required number of times until an adequate display is available. In FIG. 10, the menu 203 shows the results of the truncation with only the first letter of a city name displayed.

Using the menu 203, the user has selected cities beginning with the letter "A." The results are shown in menu 205. Now, the user elects to conduct another search-on-the-fly, by selecting the "sort-on-the-fly" option 206. The query generator 150 displays all the information fields available from the database 200, except for the information field already displayed, namely "City." The results are displayed in menu 207. The user then elects to further search on the data field "State." The query generator 150 returns the requested information as displayed in menu 209, listing five states by their common two-letter abbreviation. The user then chooses New York from the menu 209, and the query generator 150 returns a list of cities in New York, menu 211.

Next, the user elects to conduct another search-on-the-fly, option 212, and the query generator 150 returns only the remaining data fields for display in menu 215. From the menu 215, the user selects "Address" for the next data field to search, and the query generator 150 returns an menu 217 showing only first letters of the address. This signifies that the data field "Address" was too large to be easily displayed on the terminal 14. The user then elects to search on all addresses that begin with "C." The query generator 150 returns a list of addresses by displaying only street names, menu 219.

The user then elects to conduct a further search-on-the-fly, option 220, and the remaining two data fields, "Name" and "Phone" are displayed as options in menu 221. The user selects name, and the query generator returns a further breakdown of the data by last name and by first name, menu 223. This process continues, with further menus being used to select a last name and a first name from the database 200. When the final selection is made, information from the database 200 related to the individual is displayed in window 230.

In the example shown in FIG. 10, the user could have refreshed the search engine 125 at any time, and the search would have recommenced at the beginning. Alternatively, the user could, by simply selecting a prior menu, such as the menu 215, have changed the course of the search. In this alternative, if the user had gone back to the menu 215 and instead of selecting "Address" selected "Phone," then the menus 217-229 would be removed from display at the terminal 14, and the search would begin over from the point of the menu 215.

Figure 11:
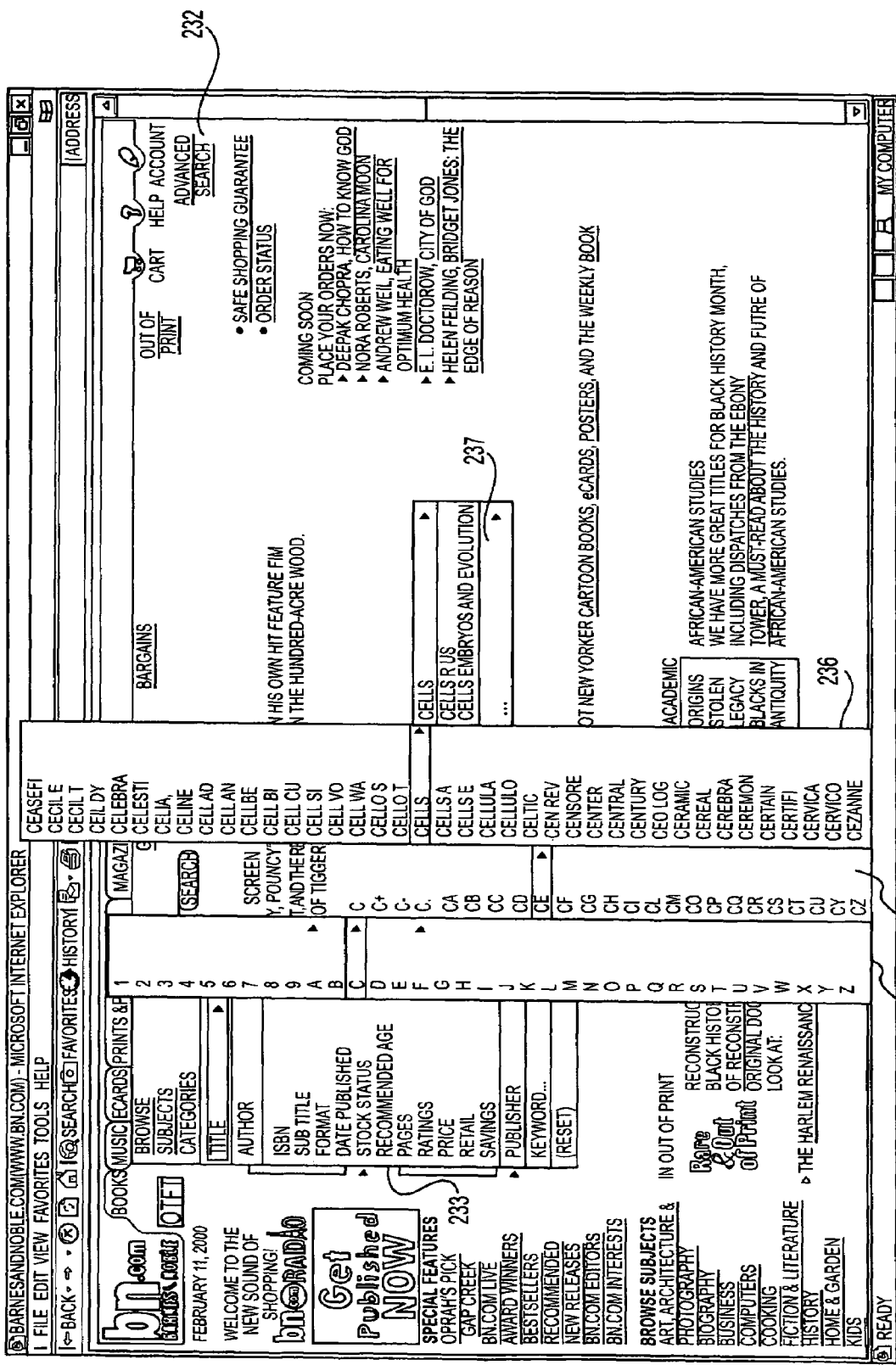
FIGS. 11-15b are additional examples of a search-on-the-fly using the search engine of FIG. 3.
Figure 12:
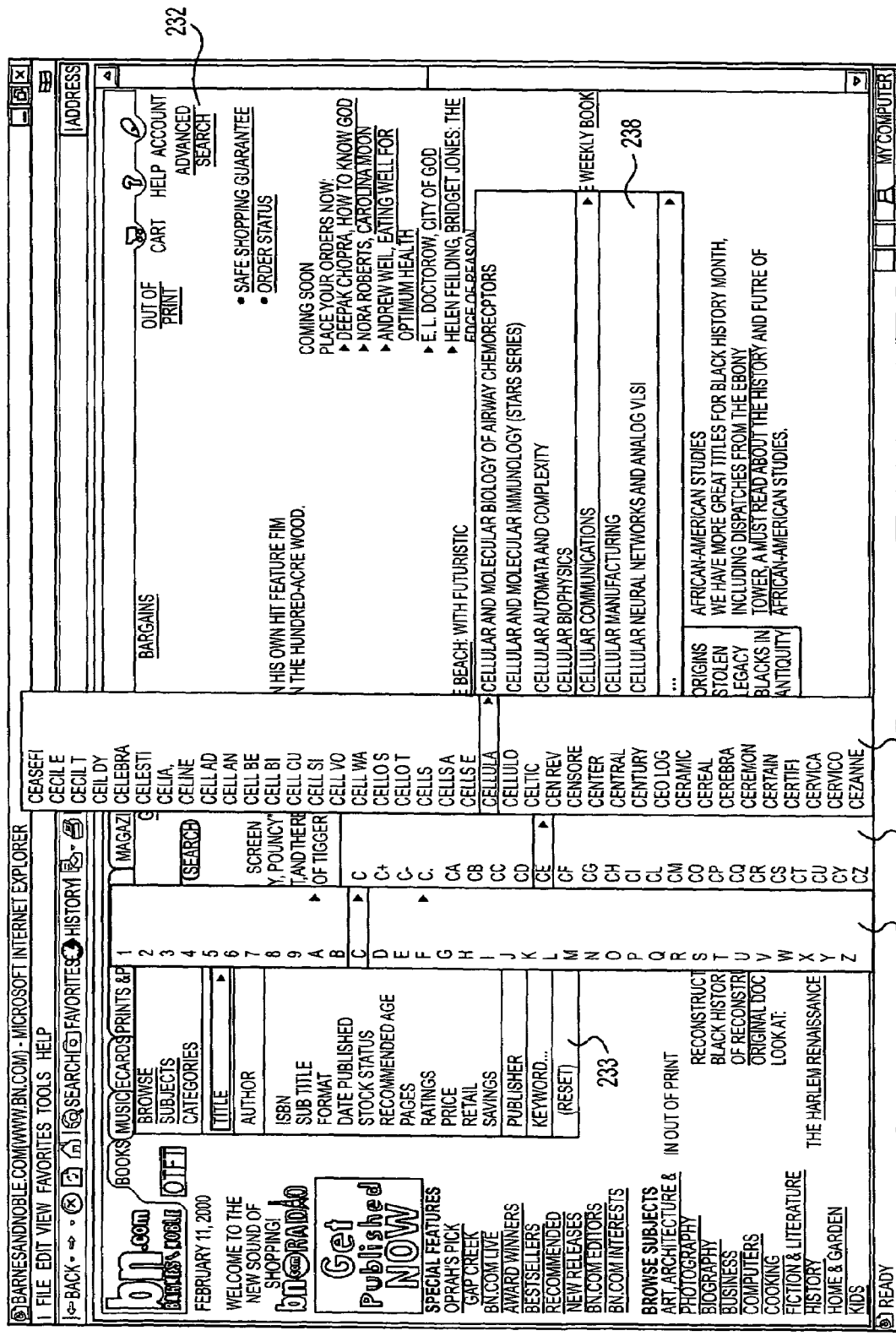
Figure 13:
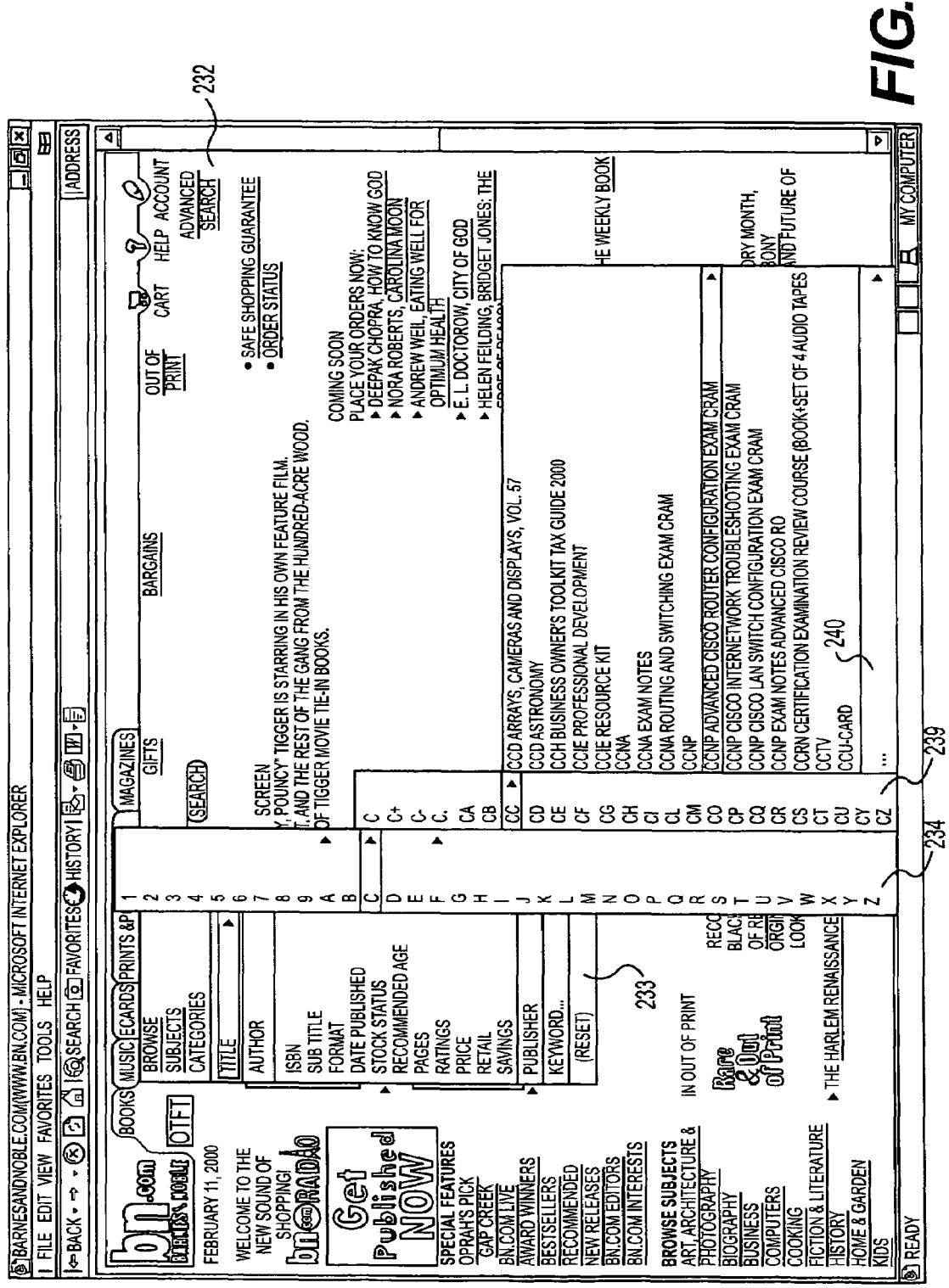

FIGS. 11-15 illustrate exemplary searches of a remote database, such as the database 13 shown in FIG. 1. The database in the illustrated example is for an Internet website 232 that sell books. The examples illustrated are based on a Barnes & Noble website. In FIG. 11, the user has applied the search engine 125 to the website 232 database, and the query generator 150 has returned a list 233 of data fields from which the user may select to access data from the website 232 database. The list 233, and other lists described below, may be displayed as overlays on the website 232. In the example illustrated, the user selects "Title" for the first search cycle. Because the list of titles is too large to easily display at the terminal 14, the truncator 152 loops until an alphanumeric list 234 is created. The list 234 is then returned to the terminal 14. For the next search cycle, the user selects titles that begin with the letter "C." Again, the data field contains too many entries to conveniently display at the terminal 14, and the truncator 152 loops as appropriate until list 235 is created. The process continues with subsequent lists 236 and 237 being returned to the terminal 14.

FIGS. 12-15b illustrate alternate searches that may be completed using the website 232 database.

For the search results shown in FIGS. 11-15a, the status control 140 may iterate as follows:

```
Status Control Started . . .
    Key: Title1 Option: Title Level: 1 Filter: Field: Title
    Key: A2 Option: A Level: 2 Filter: SUBSTRING([Title],1,1) = 'A' Field: Title
    Key: AA3 Option: AA Level: 3 Filter: SUBSTRING([Title],1,2) = 'AA' AND
    SUBSTRING([Title],1,1) = 'A' Field: Title
    Key: F4 Option: F Level: 4 Filter: SUBSTRING([Title],1,1) = 'F' Field: Title
    Key: Fa5 Option: Fa Level: 5 Filter: SUBSTRING([Title],1,2) = 'Fa' AND
    SUBSTRING([Title],1,1) = 'F' Field: Title
    Key: Favo6 Option: Favo Level: 6 Filter: SUBSTRING([Title],1,4) = 'Favo' AND
    SUBSTRING([Title],1,2) = 'Fa' AND SUBSTRING([Title],1,1) = 'F' Field: Title
    Key: C7 Option: C Level: 7 Filter: SUBSTRING([Title],1,1) = 'C' Field: Title
    Key: Ce8 Option: Ce Level: 8 Filter: SUBSTRING([Title],1,2) = 'Ce' AND
    SUBSTRING([Title],1,1) = 'C' Field: Title
    Key: Cells9 Option: Cells Level: 9 Filter: SUBSTRING([Title],1,5) = 'Cells' AND
    SUBSTRING([Title],1,2) = 'Ce' AND SUBSTRING([Title],1,1) = 'C' Field: Title
    Key: Cellula10 Option: Cellula Level: 10 Filter: SUBSTRING([Title],1,7) = 'Cellula' AND
    SUBSTRING([Title],1,2) = 'Ce' AND SUBSTRING([Title],1,1) = 'C' Field: Title
    Key: CC11 Option: CC Level: 11 Filter: SUBSTRING([Title],1,2) = 'CC' AND
    SUBSTRING([Title],1,1) = 'C' Field: Title
Status Control Terminated.
```

Figure 15A:
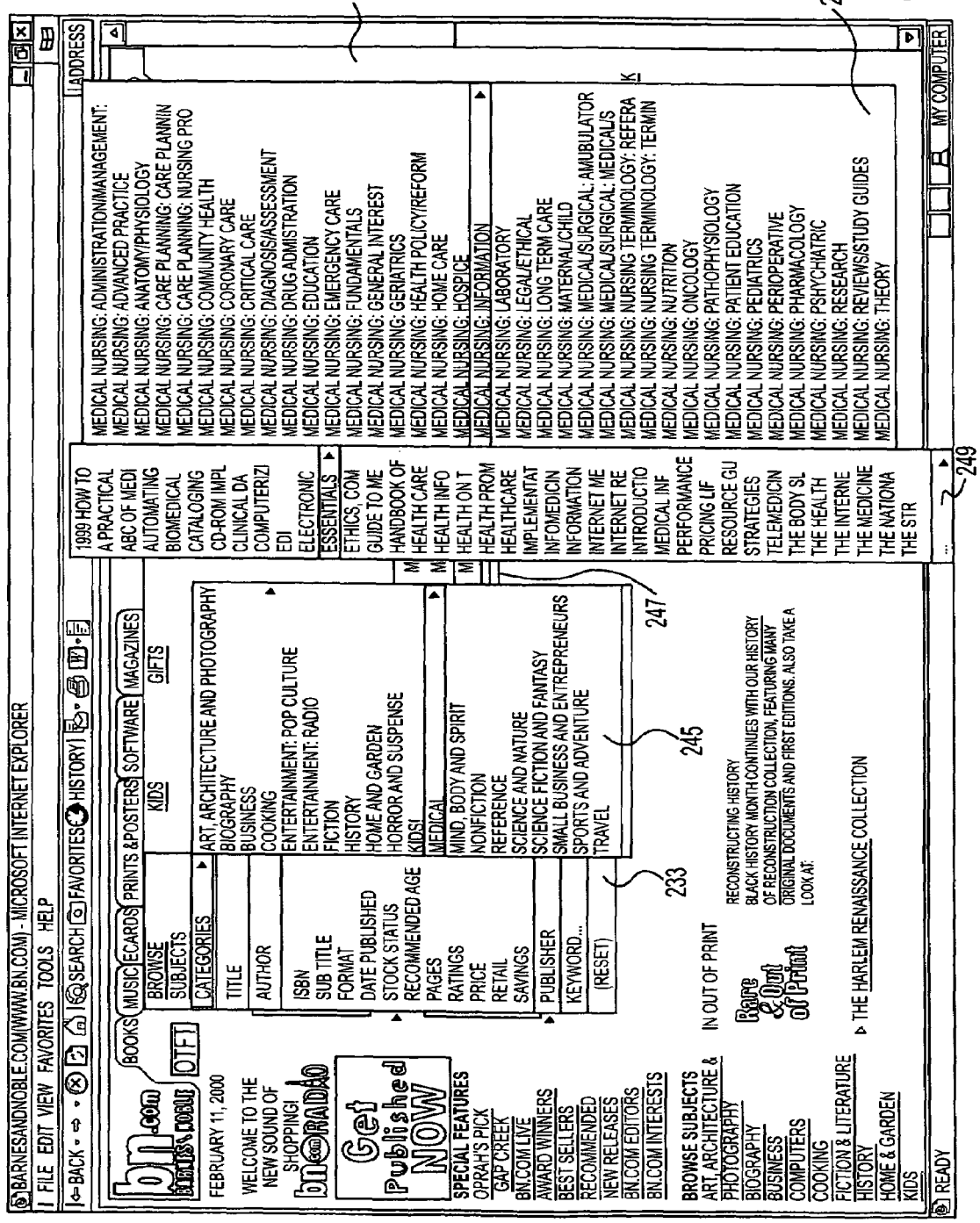
Figure 15B:
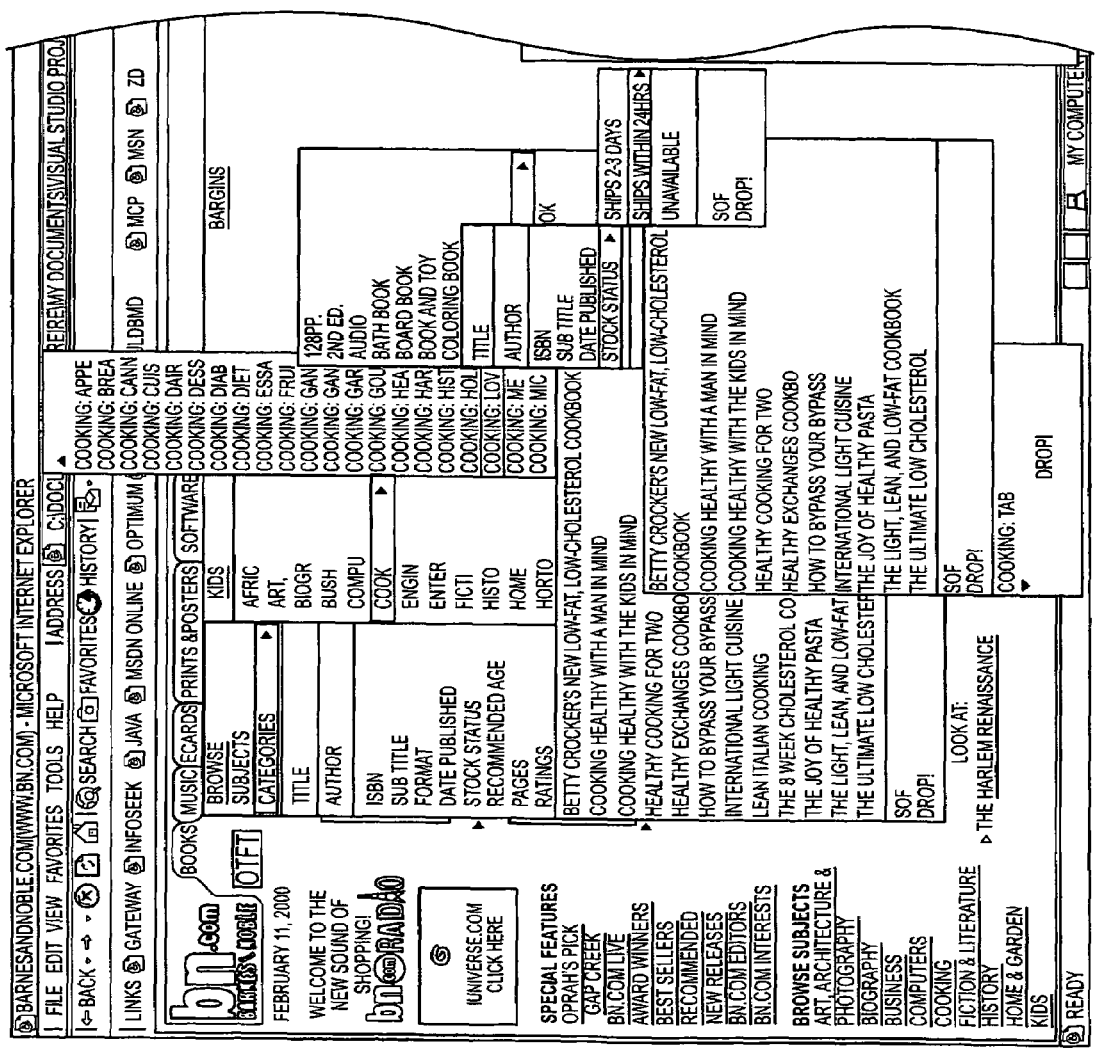

FIG. 15b shows the results for a search for a low-fat cookbook using the search engine 125 as applied to a remote database. In this example, the remote database is coupled to a Barnes & Noble web page. The first query, and resulting message strings, are illustrated by the following:

```
Query Analyzer
Message Received: ACK
Status Control: Refresh
Dispatcher
Message Sent:           Categories~--~Title~--~Author~--~ISBN~SubTitle~Format~Date
Published~Stock                                       Status~Recommended
Age~Pages~Ratings~Price~Retail~Savings~--~Publisher
Query Analyzer
Message Received: CLK#0#1#Categories
Status Control received an update:
Key: Categories1 Option: Categories Level: 1 Filter: Field: Categories
Query Generator
Request is not cached, processing
Generated Query: SELECT DISTINCT [Categories] FROM Books ORDER BY
[Categories]
Number of Matching Records: 2032
Generated Query: SELECT DISTINCT SUBSTRING([Categories],1,82) FROM Books
ORDER BY SUBSTRING([Categories],1,82)
Number of Matching Records: 2022
Generated Query: SELECT DISTINCT SUBSTRING([Categories],1,61) FROM Books
ORDER BY SUBSTRING([Categories],1,61)
Number of Matching Records: 1995
Generated Query: SELECT DISTINCT SUBSTRING([Categories],1,45) FROM Books
ORDER BY SUBSTRING([Categories],1,45)
Number of Matching Records: 1751
Generated Query: SELECT DISTINCT SUBSTRING([Categories],1,33) FROM Books
ORDER BY SUBSTRING([Categories],1,33)
Number of Matching Records: 1251
Generated Query: SELECT DISTINCT SUBSTRING([Categories],1,24) FROM Books
ORDER BY SUBSTRING([Categories],1,24)
Number of Matching Records: 799
Generated Query: SELECT DISTINCT SUBSTRING([Categories],1,18) FROM Books
ORDER BY SUBSTRING([Categories],1,18)
Number of Matching Records: 425
Generated Query: SELECT DISTINCT SUBSTRING([Categories],1,13) FROM Books
ORDER BY SUBSTRING([Categories],1,13)
Number of Matching Records: 319
Generated Query: SELECT DISTINCT SUBSTRING([Categories],1,9) FROM Books
ORDER BY SUBSTRING([Categories],1,9)
Number of Matching Records: 147
Generated Query: SELECT DISTINCT SUBSTRING([Categories],1,8) FROM Books
ORDER BY SUBSTRING([Categories],1,8)
Number of Matching Records: 111
Generated Query: SELECT DISTINCT SUBSTRING([Categories],1,7) FROM Books
ORDER BY SUBSTRING([Categories],1,7)
```

-continued

Number of Matching Records: 78
Generated Query: SELECT DISTINCT SUBSTRING([Categories],1,6) FROM Books ORDER BY SUBSTRING([Categories],1,6)
Number of Matching Records: 44
Generated Query: SELECT DISTINCT SUBSTRING([Categories],1,5) FROM Books ORDER BY SUBSTRING([Categories],1,5)
Number of Matching Records: 26
Truncator finished, took 15 seconds to make 13 iterations
Caching this request . . .
Dispatcher
Message                       Sent:                       Afric~Art,
~Biogr~Busin~Compu~Cooki~Engin~Enter~Ficti~Histo~Home     ~Horro~Kids!~Law: ~Medic~Mind,~Nonfi~Paren~Poetr~Refer~Relig~Scien~Small~Sport~Trave~Write~
Query Analyzer
Message Received: CLKCategories In the example illustrated by FIG. 15*b* and the above-listed message strings, an initial request would have returned 2032 book titles for cook books. This number of entries may be too large. Accordingly, the truncator 152, through 13 iterations, reduces the entries in a result list to 26. The entries in the truncated result list can then be easily reviewed by the user, and further searches may be performed to identify a desired book. As can be seen above, the user has selected "Categories" as a data field to search. As is also shown in FIG. 15*b*, the search engine 125 may display other information windows, such as book availability, ordering and shipping information windows. With a simple drag-and-drop cursor operation, for example, the user may then order and pay for the desired book.

Figure 16:
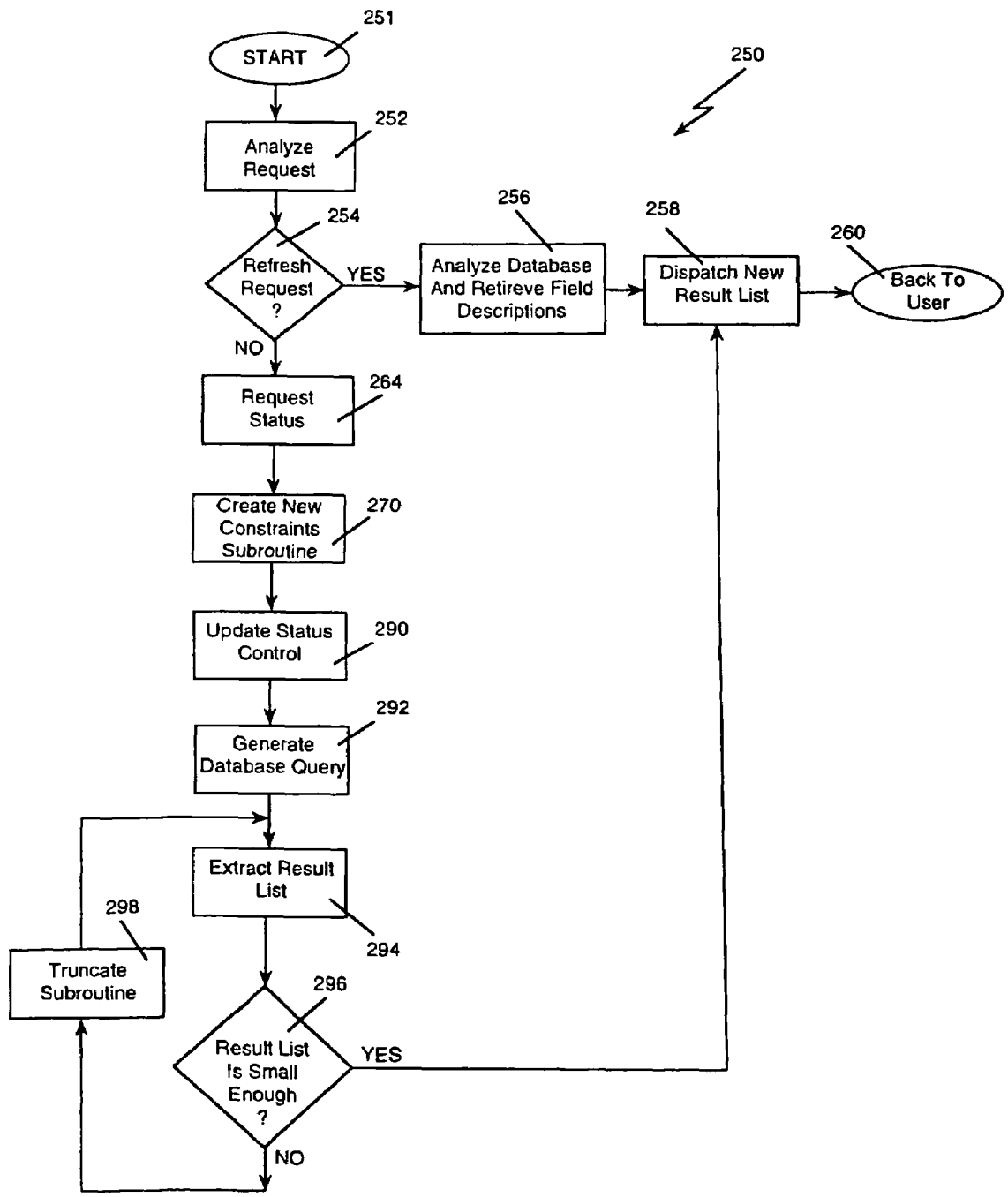
FIGS. 16-20 are flow charts illustrating operations of the search engine of FIG. 3.

FIGS. 16-20 are flow charts illustrating operations of the search engine 125. FIG. 16 is a flowchart of an overall search routine 250. The process starts in block 251. The request analyzer 130 receives the request 114, block 252. The request 114 may be made using a hierarchical menu-based display or a graphical user interface, with one or more layers. Using either the menu or the GUI, the user may enter specific details by typing, selection of iconic symbols or pre-formatted text, and by using well-known data entry techniques, for example. The request 114 may also comprise a simple text or voice query. Use of voice recognition may be particularly useful in mobile environments, and to speed access to the database 12. Use of voice recognition may include simple commands, such as UP, DOWN, and SELECT, to select search terms from a pre-formatted list that is presented to the user at the terminal 14. More sophisticated use of voice recognition may include actually speaking letters or numbers, or full search terms, such as speaking a key word for a key word search, for example.

The protocol analyzer 133 provides an output 135 to the constraint collator 136, and the constraint collator 136 determines the nature of the request, block 254. If the request 114 is a refresh request (i.e., a command to initiate the refresh function), the constraint collator 136 sends a reset command 131 to the database qualifier 160. The updated request 115 (possibly with a new constraint) is then sent to the query analyzer 150 for further processing, including analyzing the database 12, retrieving field descriptors, and formatting, block 256. The result of the data field descriptor retrieval and formatting are shown as an available data fields result list, block 258, and is returned to the terminal 14, block 260.

In block 254, if the request 114 is not a refresh request, the constraint collator 136 provides the updated request 115 (which may be an initial request, or a subsequent request) to the query generator 150, block 264. The constraint collator 136 compares the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). If the constraint status should be updated, the constraint collator 136 calls create new constraint subroutine 270, and creates new constraints.

Figure 17:
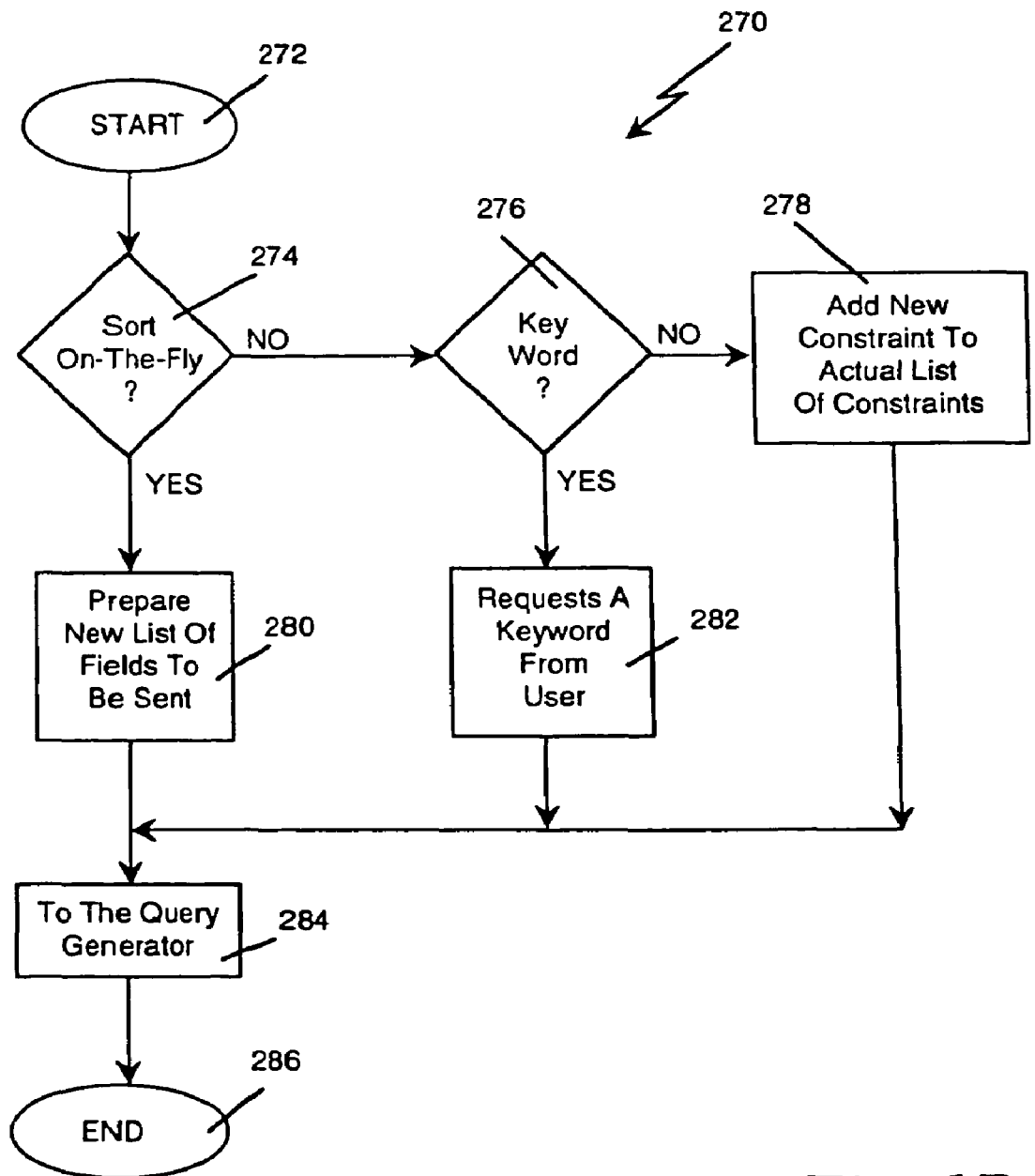

The create new constraints subroutine 270 is shown as a flowchart in FIG. 17. The subroutine starts at 272. In block 274, the constraint collator 136 determines if the request is for a sort-on-the-fly operation. If sort-on-the-fly has been selected, field assessor 162 prepares a new set of data fields, block 280. The new set of data fields are then sent to the query generator 150, block 284, and the subroutine 270 ends, block 286.

In block 274, if sort-on-the-fly was not selected, the request analyzer 130 may receive a key word constraint, block 276. The query generator 150 will then generate an input window in which the user may enter a desired key word, block 282. Alternatively, the query generator 150 may prompt the user to enter a key word using voice recognition techniques, or any other way of entering data. The process then moves to block 284. In block 276, if a key word search option was not selected, the constraint collator 136 enters the new constraint to the existing list of constraints, block 278. The process then moves to block 284.

Returning to FIG. 16, the constraint collator 136 next updates the status control 140, block 290. In block 292, using the updated constraints, the query generator 150 generates a next query of the database 12, block 292. The database driver 170 then extracts the result list from the database 12, according to the latest query, block 294. In block 296, the truncator 152 determines if the result list may be displayed at the terminal 14. If the result list cannot be displayed, the process moves to block 298, and a truncation routine is executed. The process then returns to block 294. If the result list in block 296 is small enough, the result list is provided by the dispatcher 154 to the terminal 14, block 258.

As noted above, the request analyzer 130 determines the nature of the request, including any special commands. A special command may include a command to conduct a search-on-the-fly. Alternatively, the search engine 125 may adopt a search-on-the-fly mechanism as a default value. The search engine 125 also may incorporate other special search commands, such as a Boolean search, for example.

Figure 18:
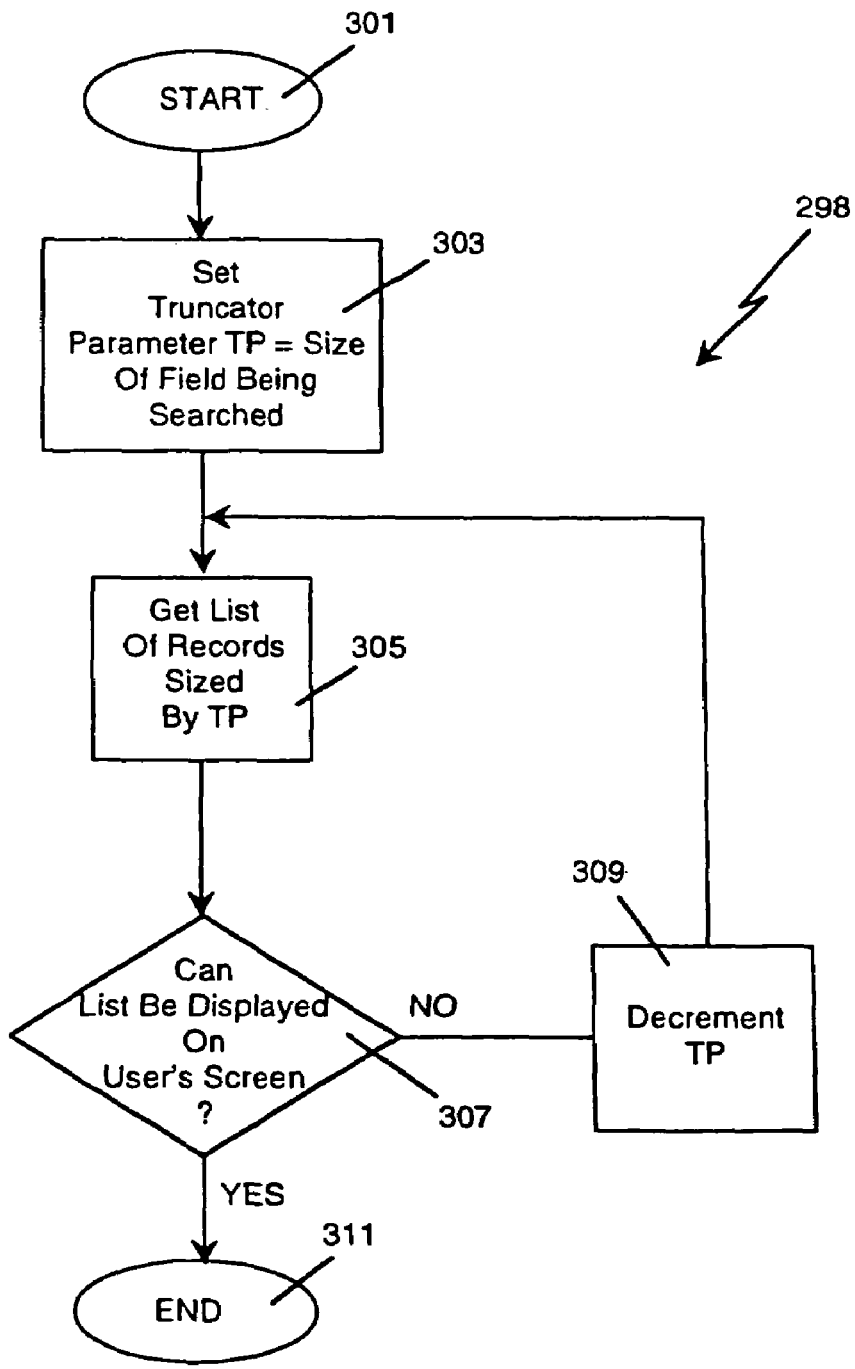
Figure 19:
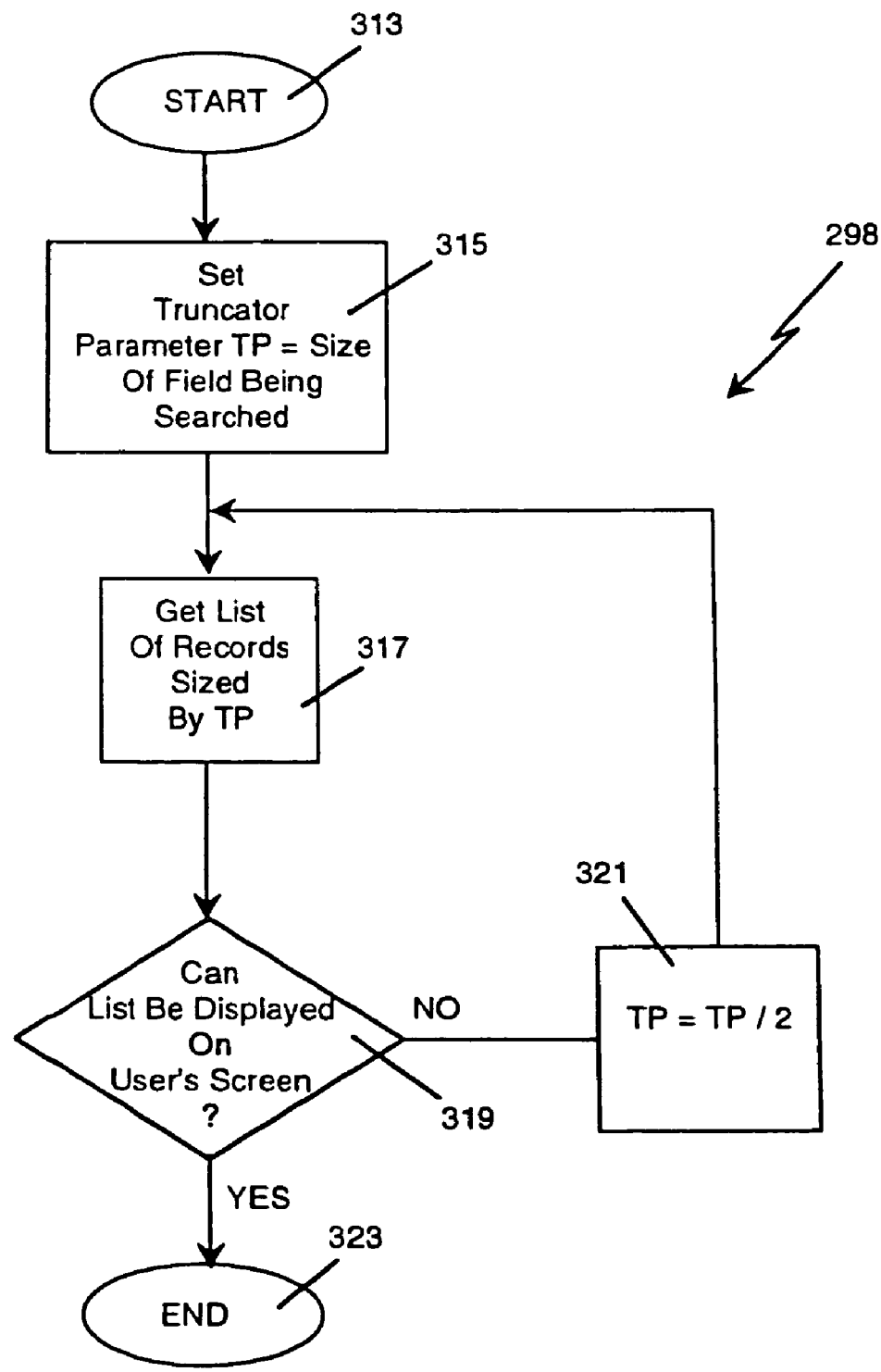
Figure 20:
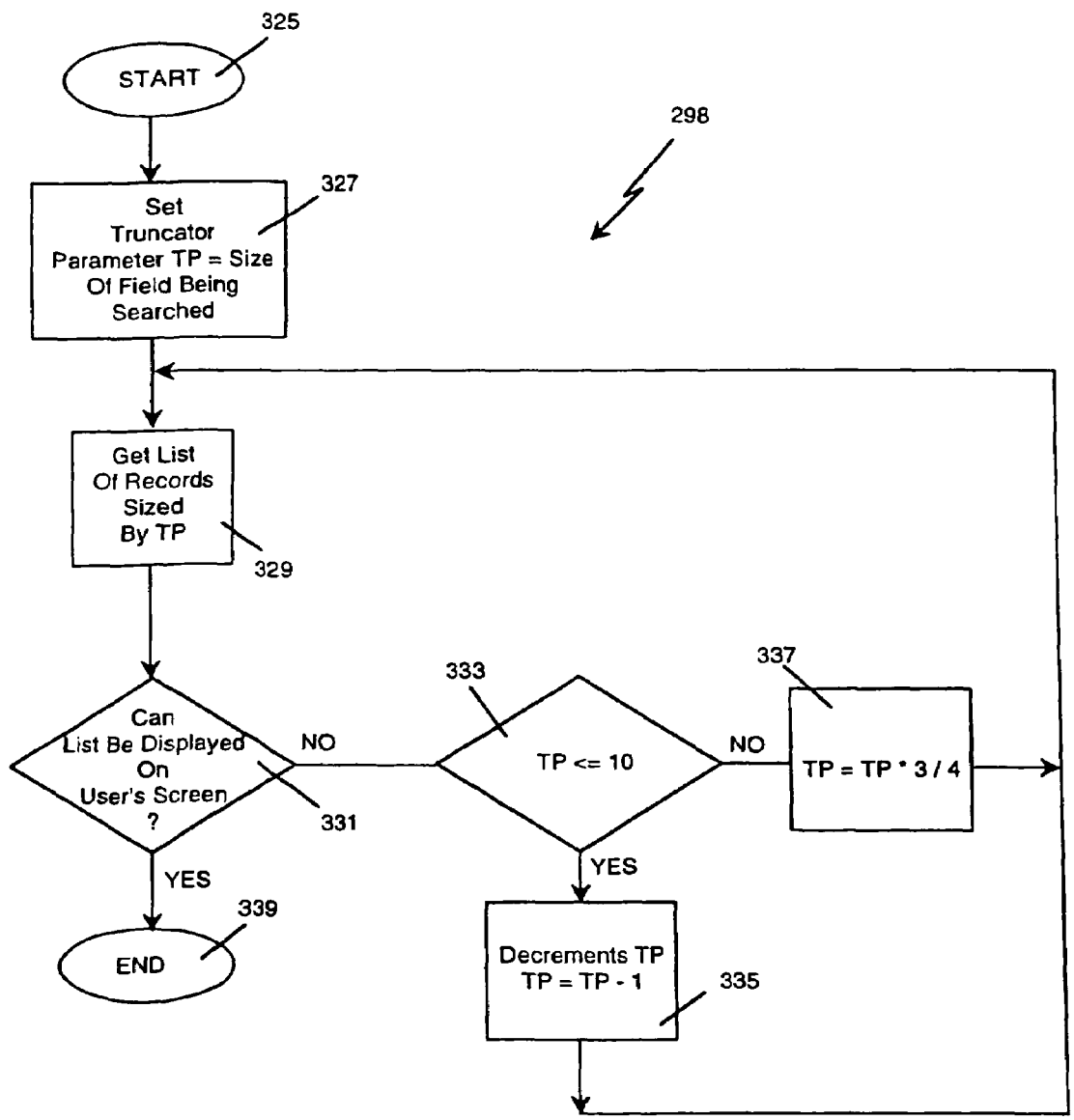

FIGS. 18-20 are flowcharts illustrating alternate truncation subroutines 298. In FIG. 18, the subroutine 298 adjusts a size of a data field by decrementing a parameter TP related to entries in a selected data field. For example, if the data field comprises a list of U.S. cities by name, the parameter TP may be the number of alphabetical characters in a name. The results of such a truncation is shown in the example of FIG. 4. The subroutine 298 starts at block 301. In block 303, the parameter TP is set to equal a size of the data field being searched. The truncator 152 then determines the list of records sized by the parameter TP, block 305. In block 307, the truncator 152 determines if the result list can be displayed at the terminal 14. If the result list cannot be displayed at the terminal 14, the truncator 152 decrements the parameter TP, block 309. Processing then returns to block 305, and the truncator 152 gets a reduced result list using the truncated parameter TP. If the result list can be displayed at the terminal 14, the process moves to block 311 and the subroutine 298 ends.

FIG. 19 is a flowchart illustrating an alternate truncation routine 298. The process starts in block 313. In block 315, the truncator 152 sets the parameter TP to a size of the data field being searched. In block 317, the truncator 152 determines the list of records sized by the parameter TP. In block 319, the truncator 152 determines if the result list can be displayed at the terminal 14. If the result list cannot be displayed, the truncator 152 adjusts the size of the data field by dividing the parameter TP by a set amount, for example, by dividing the parameter TP by two, block 321. Processing then returns to block 317, and repeats. If the result list can be displayed at the terminal 14, the process moves to block 323 and the subroutine ends.

FIG. 20 shows yet another alternative truncation subroutine 298. The process starts in block 325. In block 327, the truncator 152 sets the parameter TP to equal the size of the data field being searched. In block 329, the truncator 152 determines the list of records sized by the parameter TP. The truncator 152 then determines if the result list can be displayed at the terminal 14, block 331. If the result list cannot be displayed at the terminal 14, the truncator 152 determines if the parameter TP is less then ten, block 333. If the parameter TP is not less than ten, the truncator 152 adjusts the parameter TP by multiplying the parameter TP by a number less than one, block 337. In an embodiment, the number may be ¾. The process then returns to block 329 and repeats. In block 333, if the value of the parameter TP is less than ten, the truncator 152 decrements the parameter TP by one, block 335. Processing then returns to block 329 and repeats. In block 331, if the list can be displayed at the terminal 14, the process moves to block 339 and the subroutine 298 ends.

The examples illustrated in FIGS. 18-20 are but a few examples of the truncations subroutine. One of ordinary skill in the art could conceive of other methods to adjust the field size. In addition to using a truncation subroutine, the user may specify a limit for the field size.

Figure 21:
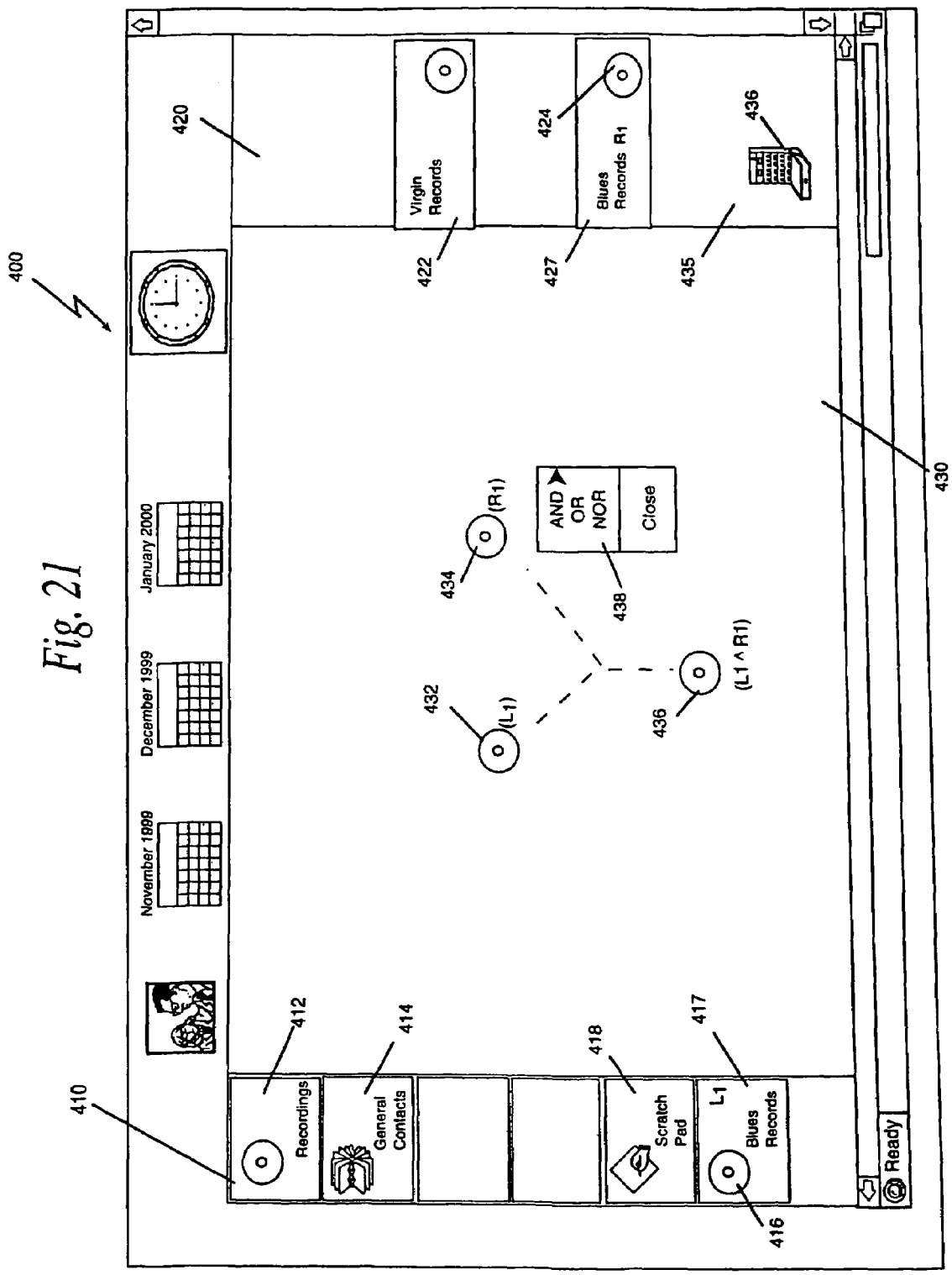
FIG. 21 illustrates a further function of the search engine of FIG. 3 in which results of more than one search are combined.

As noted above, the search engine 125 may be used for multiple searches and may be used to search multiple databases, including databases with different schemas. The results of individual searches, including the control data provided in the status control 140, are saved. The search engine 125 may then be used to further sort (search), or otherwise operate on, the results of these multiple searches. In an embodiment, the search engine 125 may perform a Boolean AND operation on two search results. The result of the Boolean AND operation would be a list of records, or entries, that are common to the two search results. FIG. 21 illustrates such a Boolean AND operation.

In FIG. 21, a GUI 400 displays local database selections 410, including a database of recordings (compact discs—CDs) 412 and a database of contacts 414. The databases 412 and 414 may be shown by text descriptions and an appropriate icon, for example. The database selections in this example are resident on a user's terminal, such as the terminal 14 shown in FIG. 1. Also displayed on the GUI 400 is a remote database selection 420 that represents databases, such as the databases 13 and 15 shown in FIG. 1, that are located remotely from the terminal 14. In the example shown in FIG. 21, the remote database selection 420 includes a database 422 for online record sales, which is represented by an icon (a CD) and a text title of the online retailer. The remote databases shown in the remote database selection 420 may include those databases for which the user has already established a link. In the example shown, the user may already have entered an Internet address for the online retailer. In addition to any returned web pages from the online retailer, the terminal 14 may then display a representation of the database 422.

Continuing with the example, the user may use the search engine 125 to conduct a search-on-the-fly of the recordings database 412 and the virgin records database 422. The user may search both databases 412 and 422 for titles of recordings that are classified as "blues." The search engine 125 may return search results 416 and 424 for searches of both databases 412 and 422, respectively. The search results 416 and 424 may be displayed in a window section 430 of the GUI 400. The results 416 and 424 may also be represented by CD icons, such as the icons 432 and 434. The search results 416 and 424 may be stored as lists in one or more temporary databases, as represented by the windows 417 and 427. The search results 416 and 424 may also be stored in a scratch pad database 418. At this point, the user may wish to determine which recordings from the list 424 are contained in the list 416. The search engine may support this function by performing a Boolean AND operation of the lists 416 and 424. The results of the Boolean AND operation are represented by the icon 436 displayed in the window 430. To execute the Boolean AND operation, the user may simply drag the icon 432 over the icon 434, and then select AND from a pop-up menu 438 that appears when the icons 432 and 434 intersect. Other techniques to execute the Boolean AND (or another Boolean function) may include typing in a command in a window, using voice recognition techniques, and other methods. In addition, other Boolean functions may be used.

The result represented by the icon 436 of the Boolean AND operation may then be stored in a database at the terminal 14, such as in the scratch pad database 418 or may be stored at another location. The result may then be subjected to further search-on-the-fly operations.

Also shown in FIG. 21 is an online-purchase module 435 that may be used to consummate purchase of a product referenced in an online database such as the database 422. To initiate such a purchase, the user may drag an iconic or text representation of a desired product listed in the search result 424 over an icon 436 in the online-purchase module 435. This drag-and-drop overlaying these icon may initiate and complete the online purchase for the desired product.

Figure 22:
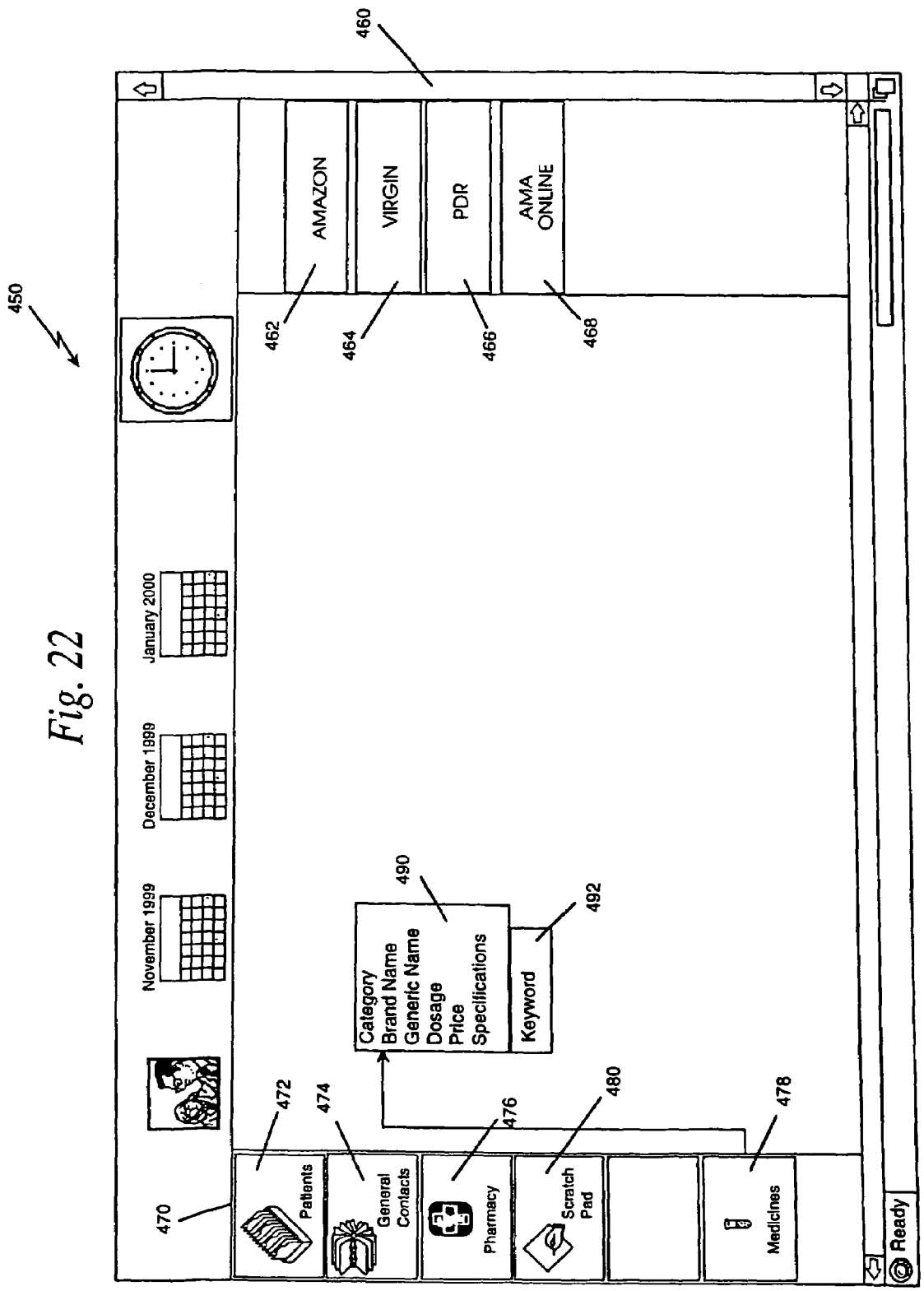
FIGS. 22-26 illustrate graphical user interfaces that may be displayed in conjunction with operation of the system of FIG. 1.

Use of the search engine 125 may be facilitated by one or more GUIs that are displayed on the terminal 14. FIGS. 22-26 are examples of such GUIs. In FIG. 22, a GUI 450 includes a display section 452 and one or more database sections such as local database section 470 and remote database section 460. The local database section 470 includes databases local to the terminal 14. In the example shown, the local databases include a patients database 472, a general contacts database 474, a pharmacy database 476, a medicines database 478 and a scratch pad database 480. The remote databases include an Amazon.com database 462, an online record retailer database 464, a Physician's Desk Reference database 466 and an American Medical Association (AMA) online database 468. The remote and local databases may be represented by a text title and an icon, both contained in a small window as shown. A user may access one of the remote or local databases by moving a cursor over the desired window and then selecting the database. In the example shown, the local medicines database 478 has been selected, and a list 490 of data fields in the medicines database 478 is displayed in the display section 452. Also included on the display section 452 is a keyword button 492 that may be used to initiate a key word search of the medicines database 478.

Figure 23:
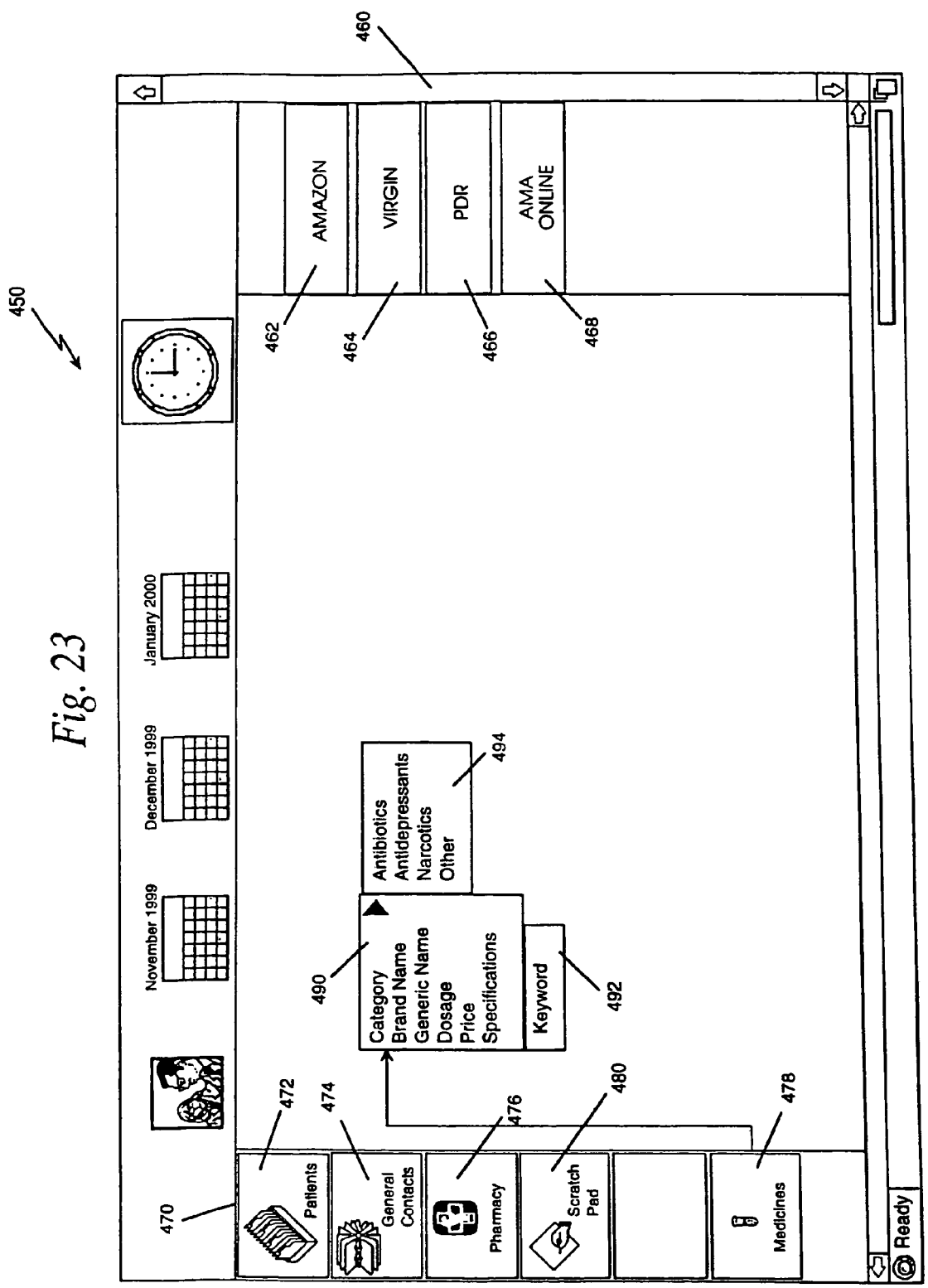

FIG. 23 shows the GUI 450 with a user selection of a category data field from the list 490. The category data field is indicated as selected by an arrow adjacent to the data field name. When the category data field is selected, a category list 494 is displayed on display section 452. The category list 494 includes four entries, as shown.

Figure 24:
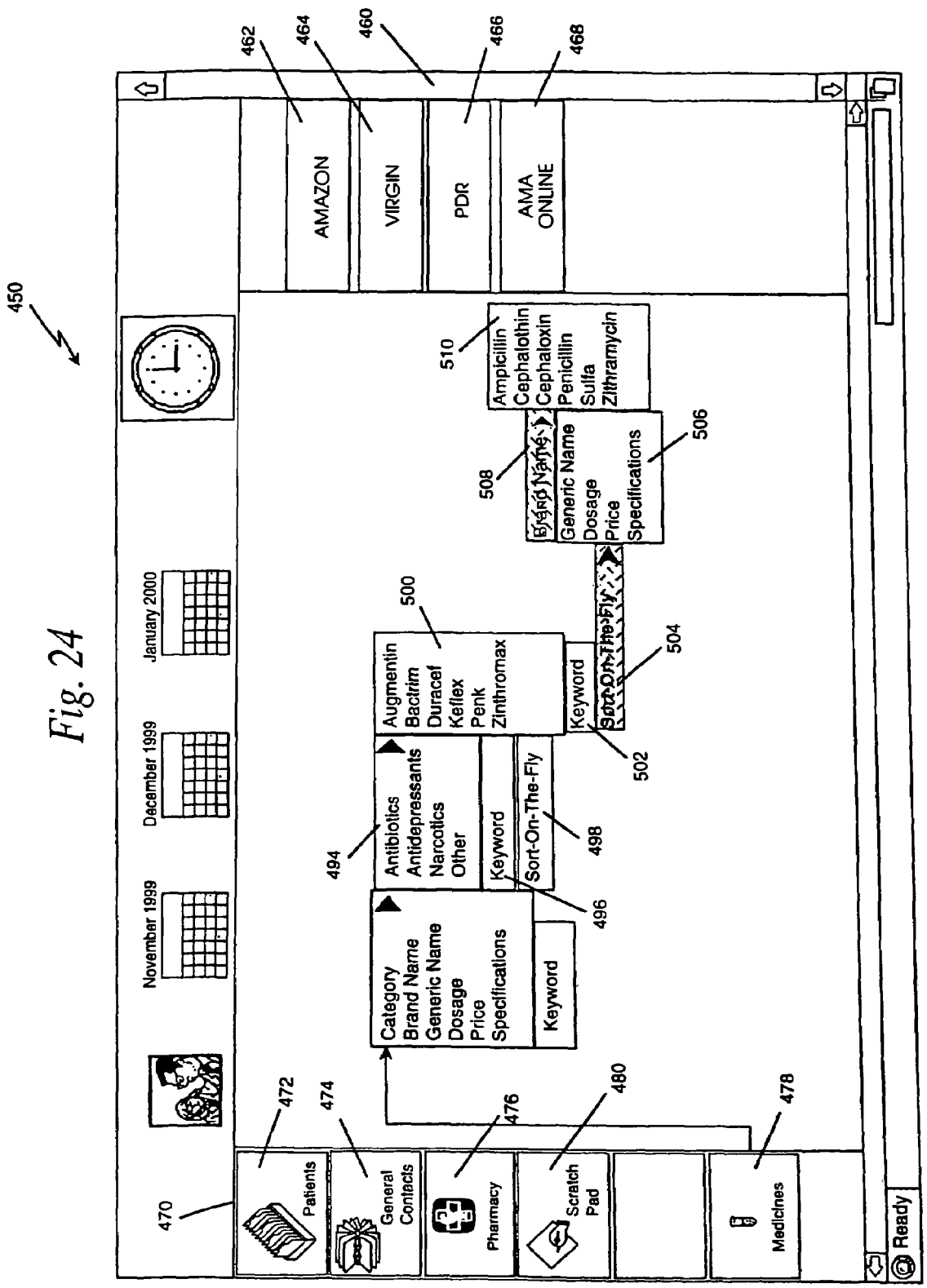

The user may continue to search the medicines database 478 using key word techniques and search-on-the-fly techniques. FIG. 24 shows the GUI 450 with results of several search cycles displayed.

Figure 25:
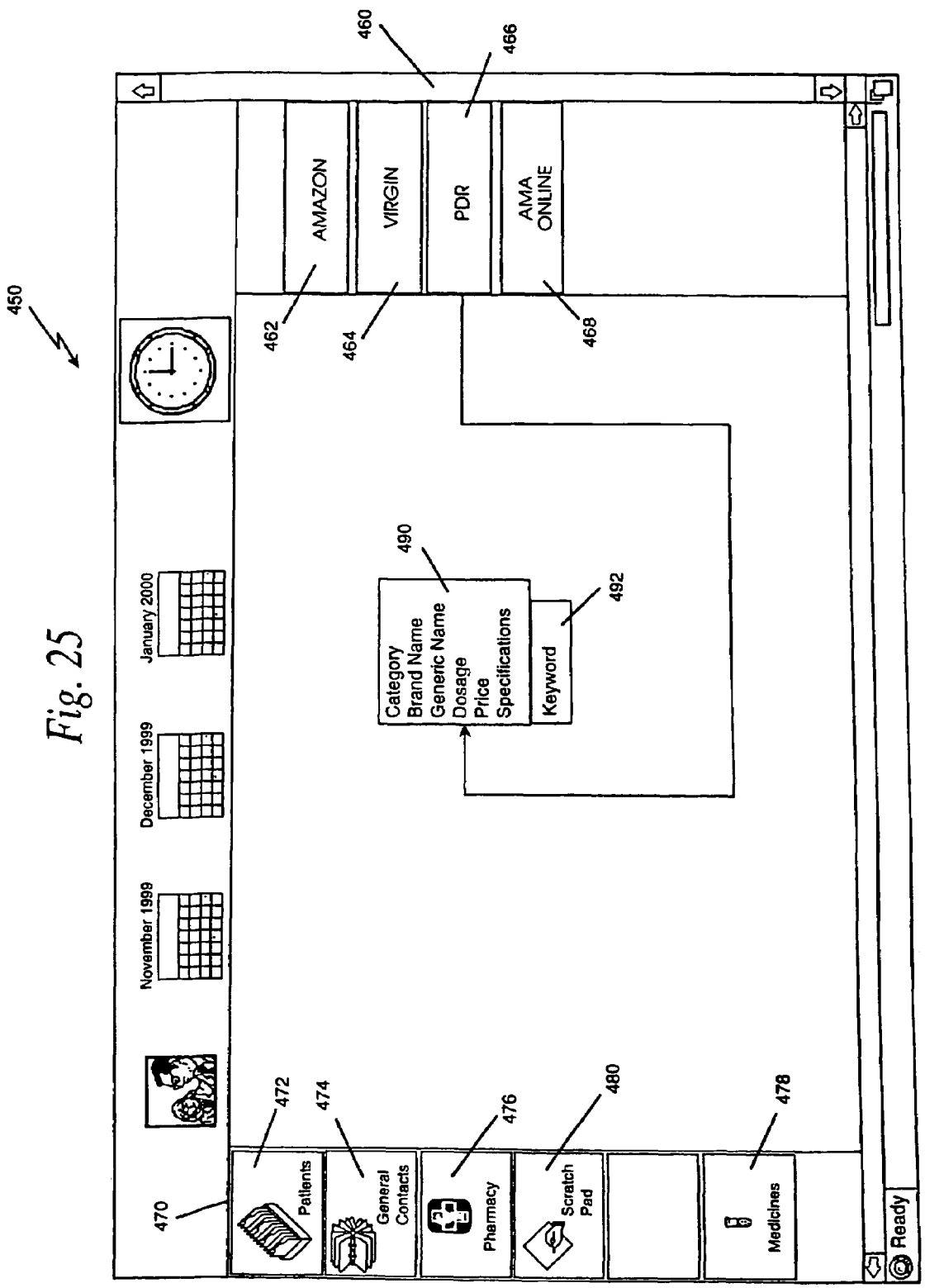
Figure 26:
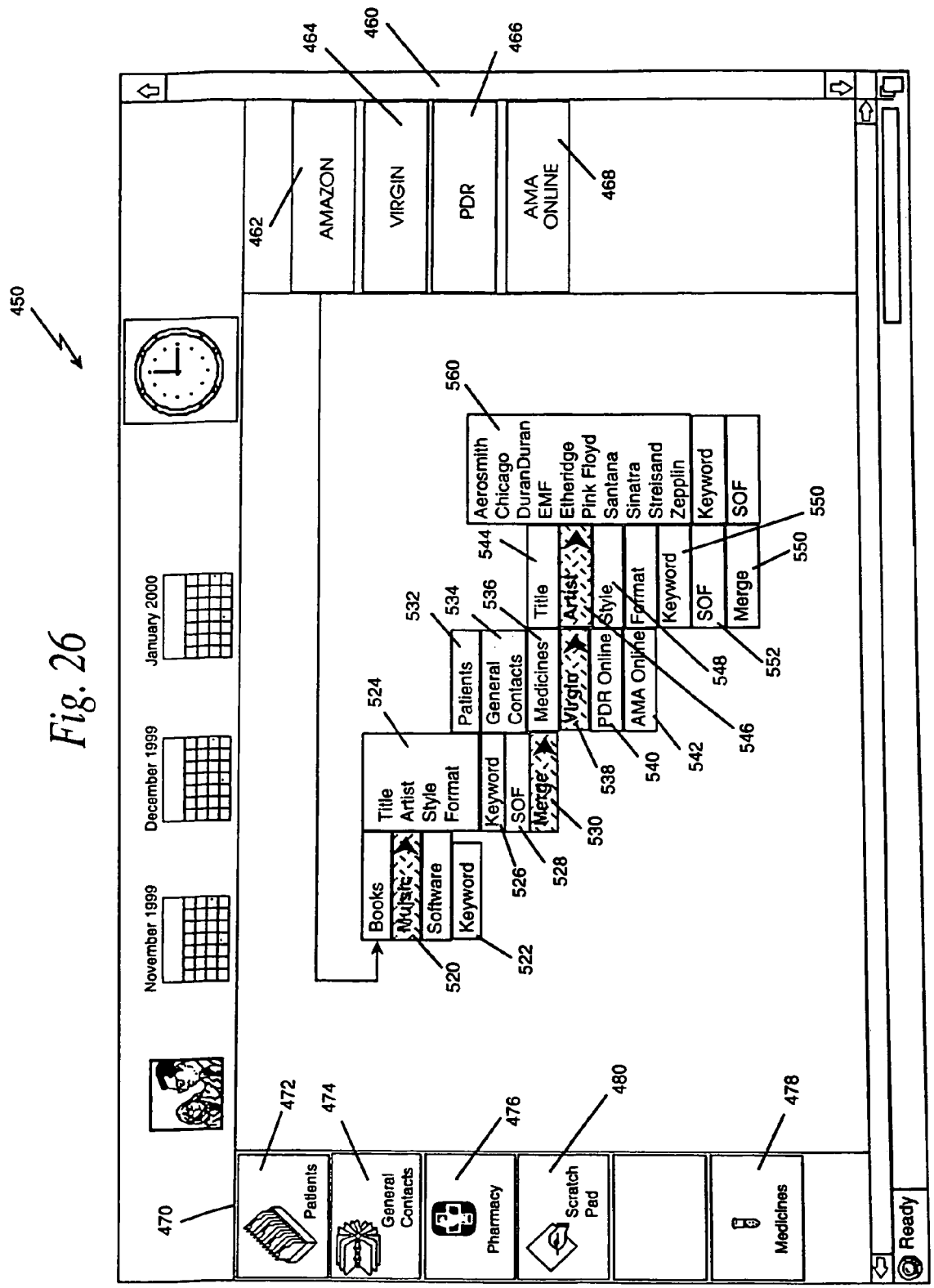

FIG. 25 illustrates a search of the PDR database 466. Such a search may be initiated by dragging a cursor to the window having the PDR 466 symbol (text or icon), and then operating a "select" button. FIG. 26 shows a search of the Amazon database 462. This search may also be initiated by a "drag-and-drop" operation.

In specific embodiments, the search engine 125 is implemented as a program executed on a general purpose computer, such as a personal computer. The search engine may also be implemented as a routine attached to a database structure. In addition, the search engine may be implemented on any processor capable of executing the routines of the program. In alternative embodiments, the search engine 125 may be implemented as a single special purpose integrated circuit (e.g., ASIC) having a main or central processor section for overall, system level control, and separate circuits dedicated to performing various different specific functions, computations and other processes under control of the central processor section. Those of ordinary skill in the art will appreciate that the search engine 125 may also be implemented using a plurality of separated dedicated or programmable integrated circuits, or other electronic circuits or devices (e.g., hard-wired electronic or logic circuits such as discrete elements circuits, or programmable logic devices, such as PLDs, PLAs, or PALs). In general, any device or assembly of devices on which a finite state machine capable of implementing flowcharts similar to the flowcharts of FIGS. 16-20 can be used to implement the search engine 125.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

The invention claimed is:

1. A method implemented on a computer for searching databases on-the-fly, comprising:

Receiving by a request analyzer executed by the processor for a selection of one or more databases from a plurality of databases;

Presenting by the request analyzer a list of data fields in a first pull down menu from the selected databases;

Receiving by the request analyzer a selection of a data field from the first pull down menu, wherein the selection is stored by a constraint collator as a first constraint parameter;

Performing by a database driver executed by the processor a first search in the selected database based on the first constraint parameter;

Generating by the database driver a first search result of the first search request based on the first constraint parameter, wherein the first search result includes a plurality of entries presented in a second pull down menu;

Receiving by the request analyzer a selection of an entry from the second pull down menu, wherein the selection is stored by the constraint collator as a second constraint parameter;

combining by the constraint collator the first constraint parameter with the second constraint parameter;

performing by the database driver a second search on the selected database based on the combined constraint parameters; and presenting a second search result of the second search based on the combined search parameters, wherein the plurality of entries of the first search result and entries of the second search result are displayed in a third pull down menu on a same screen as the first and second pull down menu.

2. The method of claim 1, wherein the second search result is truncated based on a context of the received selection such that all of the entries of the second search result are displayed on a display.

3. The method of claim 1, wherein combining the first constraint parameter with the second constraint parameter comprises:

applying a boolean function between the first constraint parameter and the second constraint parameter.

4. The method of claim 1, further comprising:

combining the first search result with the second search result.

5. The method of claim 1, further comprising:

storing the first constraint parameter and a second constraint parameter in memory; and storing the first search result and the second search result in memory.

6. The method of claim 5, further comprising:

receiving a refresh request; and in response to the request, erasing the first constraint parameter or second constraint parameter from memory.

7. The method of claim 1, further comprising:

receiving a third constraint parameter after each of a plurality of second entries of the second search result is presented wherein the third constraint parameter is a narrowing constraint parameter;

combining the third constraint parameter with the first or second constraint parameter;

conducting a third search of the one or more databases based on the combined constraint parameter including the third constraint parameter; and presenting a third search result of the third search.

8. A search engine for searching-on-the-fly executing on a computer including a processor, comprising:

a request analyzer executed by the processor for receiving a selection of one or more databases from a plurality of databases, wherein the request analyzer presents a list of data fields in a first pull down menu from the selected databases, and receives a selection of a data field from the first pull down menu;

a constraint collator executed by the processor for storing the selection as a first constraint parameter;

a database driver executed by the processor for performing a first search in the selected database based on the first constraint parameter, wherein the database driver generates a first search result of the first search request based on the first constraint parameter, wherein the first search result includes a plurality of entries presented in a second pull down menu;

wherein the request analyzer receives a selection of an entry from the second pull down menu, wherein the selection is stored by the constraint collator as a second constraint parameter;

wherein the constraint collator combines the first constraint parameter with the second constraint parameter;

wherein the database driver performs a second search on the selected database based on the combined constraint parameters;

wherein a second search result of the second search is presented based on the combined search parameters, and wherein the plurality of entries of the first search result and entries of the second search result are displayed in a third pull down menu on a same screen as the first and second pull down menu.

9. The search engine of claim 8, wherein the constraint collator stores the second constraint parameter in memory.

10. The search engine of claim 8, wherein the database driver combines the first search result with the second search result.

11. The search engine of claim 8, further comprising:

a protocol analyzer to receive the search request and to format the request to be compatible with a database being searched.

12. The search engine of claim 8, further comprising:

a truncator to receive the first search result and to truncate the first search result to completely fit all of the plurality of entries of the first search result inside a display area.

* * * * *